US006870641B2

(12) United States Patent
Kakutani

(10) Patent No.: US 6,870,641 B2
(45) Date of Patent: Mar. 22, 2005

(54) IMAGE PROCESSING APPARATUS, METHOD OF IMAGE PROCESSING, PRINT CONTROL APPARATUS, AND RECORDING MEDIA

(75) Inventor: Toshiaki Kakutani, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 517 days.

(21) Appl. No.: 09/967,888

(22) Filed: Sep. 28, 2001

(65) Prior Publication Data

US 2002/0075494 A1 Jun. 20, 2002

(30) Foreign Application Priority Data

Oct. 6, 2000 (JP) ........................................ 2000-307896
Aug. 6, 2001 (JP) ........................................ 2001-238086

(51) Int. Cl.[7] .............................................. G06K 15/00
(52) U.S. Cl. .................................... 358/3.03; 358/3.09
(58) Field of Search ............................. 358/3.03, 3.04, 358/3.09, 3.11, 3.12, 3.23, 3.05, 447, 463, 471

(56) References Cited

U.S. PATENT DOCUMENTS

| 5,337,160 A | 8/1994 | Jones ......................... 355/474 |
| 5,481,293 A * | 1/1996 | Kanno ......................... 347/251 |
| 2002/0039199 A1 * | 4/2002 | Nose ........................ 358/3.03 |

FOREIGN PATENT DOCUMENTS

JP    2000-101835    4/2000

* cited by examiner

*Primary Examiner*—Jerome Grant, II
(74) *Attorney, Agent, or Firm*—Beyer Weaver & Thomas, LLP

(57) ABSTRACT

The technique of the present invention temporarily registers a tone error, which arises in each pixel due to determination of the dot on-off state in the pixel, in an intermediate buffer. The technique calculates diffusion errors or error divisions, which are diffused to each of non-processed pixels in a neighborhood of a preset number of pixels, from tone errors arising in the preset number of pixels, and writes the error divisions into an error buffer. One procedure diffuses each tone error into the intermediate buffer in response to every occurrence of the tone error, and subsequently writes the diffused error divisions into the error buffer. Another procedure registers tone errors arising in the preset number of pixels in the intermediate buffer and writes the error divisions, which are calculated from the registered tone errors with regard to the preset number of pixels, into the error buffer. Compared with the conventional technique that diffuses each tone error into the error buffer in response to every occurrence of the tone error, either of these procedures enables collective diffusion of the tone errors with regard to the preset number of pixels, thus ensuring higher-speed diffusion of the tone error. The error diffusion may be attained by utilizing a procedure mathematically equivalent to the least mean square error method.

22 Claims, 20 Drawing Sheets

Fig.6(a)

|  | ///// | K01<br>1/4 |
|---|---|---|
| K1-1<br>1/4 | K10<br>1/4 | K11<br>1/4 |

Fig.6(b)

|  |  | ///// | K01<br>1/8 | K02<br>1/8 |
|---|---|---|---|---|
| K1-2<br>1/8 | K1-1<br>1/8 | K10<br>1/4 | K11<br>1/8 | K12<br>1/8 |

Fig.6(c)

|  |  |  | ///// | K01<br>1/8 | K02<br>1/16 | K03<br>1/16 |
|---|---|---|---|---|---|---|
| K1-3<br>1/16 | K1-2<br>1/16 | K1-1<br>1/8 | K10<br>1/4 | K11<br>1/8 | K12<br>1/16 | K13<br>1/16 |

Fig.6(d)

|  |  | ///// | K01<br>1/8 | K02<br>1/16 |
|---|---|---|---|---|
| K1-2<br>1/16 | K1-1<br>1/8 | K10<br>1/4 | K11<br>1/8 | K12<br>1/16 |
|  | K2-1<br>1/16 | K20<br>1/16 | K21<br>1/16 |  |

Fig.6(e)

|  | ///// | K01<br>7/16 |
|---|---|---|
| K1-1<br>3/16 | K10<br>5/16 | K11<br>1/16 |

Fig.6(f)

|  |  | ///// | K01<br>4/16 | K02<br>2/16 |
|---|---|---|---|---|
| K1-2<br>1/16 | K1-1<br>2/16 | K10<br>5/16 | K11<br>1/16 | K12<br>1/16 |

| R01 | K01·E00 |
| R02 | |
| R1-1 | K1-1·E00 |
| R10 | K10·E00 |
| R11 | K11·E00 |
| R12 | |

| R01 | K01·E00 |
| R02 | K01·E01 |
| R1-1 | K1-1·E00 |
| R10 | K10·E00 + K1-1·E01 |
| R11 | K11·E00 + K10·E01 |
| R12 | K11·E01 |

| R01 | K01·E00 |
| R02 | K01·E01 |
| R1-1 | K1-1·E00 |
| R10 | K10·E00 + K1-1·E01 |
| R11 | K11·E00 + K10·E01 |
| R12 | K11·E01 |

Fig.19(a)

| K-1-1 | K-10 | K-11 |
|---|---|---|
| 1/4 | 1/4 | 1/4 |
| K0-1 | ////  | |
| 1/4 | | |

Fig.19(b)

| K-1-2 | K-1-1 | K-10 | K-11 | K-12 |
|---|---|---|---|---|
| 1/8 | 1/8 | 1/4 | 1/8 | 1/8 |
| K0-2 | K0-1 | //// | | |
| 1/8 | 1/8 | | | |

Fig.19(c)

| K-1-3 | K-1-2 | K-1-1 | K-10 | K-11 | K-12 | K-13 |
|---|---|---|---|---|---|---|
| 1/16 | 1/16 | 1/8 | 1/4 | 1/8 | 1/16 | 1/16 |
| K0-3 | K0-2 | K0-1 | //// | | | |
| 1/16 | 1/16 | 1/8 | | | | |

Fig.19(d)

| | K-2-1 | K-20 | K-21 | | |
|---|---|---|---|---|---|
| | 1/16 | 1/16 | 1/16 | | |
| K-1-2 | K-1-1 | K-10 | K-11 | K-12 | |
| 1/16 | 1/8 | 1/4 | 1/8 | 1/16 | |
| K0-2 | K0-1 | //// | | | |
| 1/16 | 1/8 | | | | |

IMAGE PROCESSING APPARATUS, METHOD OF IMAGE PROCESSING, PRINT CONTROL APPARATUS, AND RECORDING MEDIA

BACKGROUND OF THE INVENTION

1. Field of the Invention

The present invention relates to a technique of converting image data that are expressed by tone values of pixels constituting an image. More specifically the present invention pertains to a technique of converting the image data into a specific expression format based on the dot on-off state of each pixel.

2. Description of the Related Art

Image display devices that create dots on a display medium, such as a printing medium or the screen of a liquid crystal display, to express an image are widely used as output devices of diverse image devices. The image display device takes only either the dot on state or the dot off state as local expression, but enables display of an image of s continuously varying tone by adequately adjusting the dot formation density according to the tone values of an original image.

Typical techniques applied for such image display devices to determine the dot on-off state in each pixel and ensure dot creation with an adequate density corresponding to the tone values of the original image include an error diffusion method and a least mean square error method, which are mathematically equivalent to each other.

The error diffusion method diffuses and stores an error of tone expression, which arises in a pixel of interest due to creation of a dot or creation of no dot in the pixel, into peripheral non-processed pixels in the vicinity of the pixel of interest. The error diffusion method determines the dot on-off state in each non-processed pixel such as to cancel the tone errors diffused from peripheral processed pixels. The least mean square error method, on the other hand, stores the error of tone expression, which arises due to the determination of the dot on-off state, in the pixel of interest without diffusion into peripheral non-processed pixels. The least mean square error method reads the tone errors stored in peripheral processed pixels, and determines the dot on-off state in each non-processed pixel such as to cancel the tone errors. Either of these two techniques determines the dot on-off state such as to cancel the tone errors arising in the peripheral processed pixels, thereby creating dots with an adequate density corresponding to the tone values of the original image. Application of these techniques for determination of the dot on-off state thus enables high-quality images to be displayed by the image display device.

The error diffusion method determines the dot on-off state in each non-processed pixel, while diffusing the error of tone expression arising in each processed pixel into peripheral non-processed pixels. The process of diffusing and storing the tone error into the peripheral non-processed pixels undesirably extends the processing time required for determination of the dot on-off state. The least mean square error method, on the other hand, determines the dot on-off state in each non-processed pixel, while reading the errors of tone expression from peripheral processed pixels. The process of reading the tone errors from the peripheral processed pixels undesirably extends the processing time required for determination of the dot on-off state. Either of these conventional methods requires some time for determination of the dot on-off state and accordingly has difficulties in high-speed display of images.

SUMMARY OF THE INVENTION

The object of the present invention is thus to provide a technique of shortening the processing time required for determination of the dot on-off state while keeping the picture quality at an equivalent level to the picture quality attained by application of either the error diffusion method or the least mean square error method, thus ensuring high-speed display of a high-quality image.

At least part of the above and the other related objects is attained by a first image processing apparatus that receives image data representing a tone value- of each pixel, determines dot on-off state in each pixel by taking into account the tone value of the pixel, and converts the image data into a specific expression format based on the dot on-off state. The first image processing apparatus includes: a tone error registration unit that calculates a tone error arising in each pixel due to determination of the dot on-off state in the pixel, based on a result of the determination of the dot on-off state, and temporarily registers therein the calculated tone error in a temporally memory; a diffusion error storage unit that calculates diffusion errors diffused to each of non-processed pixels;- which are in a neighborhood of a preset number of pixels and have not yet been subjected to the determination of the dot on-off state, based on the temporarily registered tone errors arising in the preset number of pixels, and stores the calculated diffusion errors into an error memory assigned to the each non-processed pixel; and a dot creation decision unit that determines the dot on-off state in each non-processed pixel, based on the tone value of the each non-processed pixel, by taking into account the calculated diffusion errors mapped to the each non-processed pixel.

There is a first image processing method corresponding to the first image processing apparatus discussed above. The present invention is accordingly directed to the first image processing method that receives image data representing a tone value of each pixel, determines dot on-off state in each pixel by taking into account the tone value of the pixel, and converts the image data into a specific expression format based on the dot on-off state. The first image processing method includes the steps of: calculating a tone error arising in each pixel due to determination of the dot on-off state in the pixel, based on a result of the determination of the dot on-off state, and temporarily registering the calculated tone error in a temporally memory; calculating diffusion errors diffused to each of non-processed pixels, which are in a neighborhood of a preset number of pixels and have not yet been subjected to the determination of the dot on-off state, based on the temporarily registered tone errors arising in the preset number of pixels; storing the calculated diffusion errors into an error memory assigned to the each non-processed pixel; and determining the dot on-off state in each non-processed pixel, based on the tone value of the each non-processed pixel, by taking into account the calculated diffusion errors mapped to the each non-processed pixel.

In the first image processing apparatus and the corresponding first image processing method, the process temporarily registers the tone error, which arises due to the determination of the dot on-of state, calculates diffusion errors diffused to each non-processed pixel from the tone errors with regard to a preset number of pixels, and stores the calculated diffusion errors into an error memory assigned to the each non-processed pixel. This arrangement enables the tone errors arising in the preset number of pixels to be collectively diffused and stored into peripheral non-processed pixels. Compared with the technique of individually diffusing and storing the tone error arising in each pixel, this technique attains the higher-speed storage. This desirably shortens the processing time required for the determination of the dot on-off state and thus ensures high-speed display of high-quality images.

In the first image processing apparatus, it is preferable that the tone error registration unit enables a higher-speed operation of reading and writing the tone error than the diffusion error storage unit.

The tone errors with regard to the preset number of pixels are temporarily registered in a temporally memory by the tone error registration unit and then stored in an error memory by the diffusion error storage unit. Namely the tone error registration unit reads and writes as frequently as the diffusion error storage unit dose. The tone error registration unit ensuring higher-speed reading and writing operations than the diffusion error storage unit desirably shortens the time period between the occurrence of the tone error and the final storage of the tone error in the form of the diffusion error. This effectively shortens the processing time required for the determination of the dot on-off state.

In the first image processing apparatus and the corresponding first image processing method, the following process may be adopted to store the diffusion errors into an error memory assigned to each non-processed pixel. The process calculates an error division diffused to each of non-processed pixels every time the tone error is calculated, and accumulates the calculated error division in a temporally memory assigned to the each non-processed pixel. Every time the error divisions with regard to the preset number of pixels are accumulated, all the accumulated error divisions in each non-processed pixel are written into an error memory assigned to the each non-processed pixel as the diffusion errors mapped to the each non-processed pixel.

The arrangement of accumulating the error division in each non-processed pixel every time the tone error is calculated ensures the high-speed process of calculating the tone errors arising in the preset number of pixels and writing the diffusion errors into an error memory assigned to each non-processed pixel. One cycle of the diffusion and storage process may not allow all the required tone errors to be diffused and stored in peripheral non-processed pixels. Accumulation of the error divisions with regard to the preset number of pixels, however, enables all the required tone errors to be diffused and stored in the error memory assigned to peripheral non-processed pixels. This method quickens the process of diffusing and storing the diffusion errors into peripheral non-processed pixels, thus effectively shortening the processing time required for the determination of the dot on-off state.

In the first image processing apparatus and the corresponding first image processing method, another process may be adopted to store the diffusion errors into the specific module assigned to each non-processed pixel. The process registers tone errors arising in the preset number of pixels, calculates diffusion errors diffused to each of the non-processed pixels from the registered tone errors with regard to the preset number of pixels, and writes all the calculated diffusion errors into an error memory assigned to the each non-processed pixel.

Registration of the tone errors arising in the preset number of pixels preferably simplifies the process of calculating the diffusion errors to be diffused to each non-processed pixel and the process of collectively diffusing the tone errors arising in the preset number of pixels to each peripheral non-processed pixel. The preset number of pixels is smaller than the number of peripheral non-processed pixels. This arrangement thus desirably saves the storage capacity, compared with the method of accumulating the error division in each non-processed pixel every time the tone error is calculated.

In the first image processing apparatus and the corresponding first image processing method, still another process may be adopted to store the diffusion errors into the specific module assigned to each non-processed pixel. The process calculates an error division of each temporarily registered tone error, which is distributed to each of the non-processed pixels, and accumulates the calculated error division in the each non-processed pixel. The process then stores error divisions, which are distributed from the preset number of pixels to each of the non-processed pixels, into an error memory assigned to the each non-processed pixel as the diffusion errors mapped to the each non-processed pixel.

The process accumulates the error division in each non-processed pixel every time the tone error is calculated, and stores the error divisions, which are distributed from the preset number of pixels and accumulated in each non-processed pixel, as the diffusion errors mapped to the each non-processed pixel. This arrangement desirably ensures the high-speed storage of the diffusion errors distributed from the preset number of pixels into an error memory assigned to each non-processed pixel.

In the first image processing apparatus and the corresponding first image processing method, another process may be adopted to store the diffusion errors into the specific module assigned to each non-processed pixel. The process temporarily registers tone errors arising in the preset number of pixels, calculates diffusion errors diffused to a specific pixel, which is included in the non-processed pixels and receives diffusion errors from all the registered tone errors with regard to the preset number of pixels, and stores the calculated diffusion errors into an error memory assigned to the specific pixel.

The arrangement of registering the tone errors arising in the preset number of pixels, calculating the diffusion errors diffused to the specific pixel, and storing the calculated diffusion errors simplifies the process of diffusing and storing the diffusion errors into peripheral non-processed pixels. This desirably quickens the process of diffusing and storing the tone errors arising in the preset number of pixels, thus effectively shortening the processing time required for display of images.

In the first image processing apparatus and the corresponding first image processing method, still another process may be adopted to store the diffusion errors into the specific module assigned to each non-processed pixel. The process calculates diffusion errors diffused to each of first non-processed pixels, which are inside a predetermined first area in the neighborhood of the preset number of pixels, from the tone errors with regard to the preset number of pixels, and stores the calculated diffusion errors in an error memory assigned to the each first non-processed pixel. Every time a tone error is calculated, the process calculates from the calculated tone error a diffusion error diffused to each of second non-processed pixels, which are outside the predetermined first area but still in the neighborhood of the preset number of pixels, and stores the calculated diffusion error into an error memory assigned to the each second non-processed pixel.

This arrangement collectively diffuses the error divisions distributed from the preset number of pixels into each of the first non-processed pixels. This effectively shortens the processing time required for the determination of the dot on-off state.

One preferable embodiment of the image processing apparatus having the above arrangement may calculate and store the diffusion error diffused to each of the second non-processed pixels, which are inside a predetermined second area including the predetermined first area.

In the case of diffusing the tone errors arising in the preset number of pixels into the wider range, the diffusion range of the tone errors includes the greater number of non-processed pixels. This undesirably complicates the process of collectively diffusing and storing the tone errors with regard to the preset number of pixels. The procedure of the preferable embodiment divides the diffusion range of the tone errors into the predetermined first area in the vicinity of the preset number of pixels, and the predetermined second area including the predetermined first area. The procedure calculates the diffusion errors diffused to each of first non-processed pixels, which are inside the predetermined first area, from the tone errors with regard to the preset number of pixels and stores the calculated diffusion errors. As for each of second non-processed pixels, which are outside the predetermined first area, every time a tone error is calculated, the procedure calculates the diffusion error from the calculated tone error and stores the calculated diffusion error into an error memory assigned to the each second non-processed pixel. This arrangement decreases the number of non-processed pixels, to which the tone errors arising in the preset number of pixels are to be collectively diffused, thus preferably ensuring the simplified processing. Any of the diverse techniques discussed above may be applied to collectively diffuse and store the tone errors with regard to the preset number of pixels into the first non-processed pixels inside the predetermined first area.

In the first image processing apparatus and the corresponding first image processing method, one preferable application selectively changes over a diffusion range of diffusing the tone error into non-processed pixels between the predetermined first area in the neighborhood of the preset number of pixels and the predetermined second area including the predetermined first area, according to a condition relating to the determination of the dot on-off state.

The requirement of the picture quality may lead to application of the technique to change over the error diffusion range according to the condition relating to the determination of the dot on-off state. In such cases, one preferably applicable procedure selectively changes over the diffusion range of the tone error between the predetermined first area in the neighborhood of the preset number of pixels and the predetermined second area including the predetermined first area, while directly diffusing the tone error into rather apart non-processed pixels that are not included in the predetermined first area. This arrangement desirably simplifies the process of collectively diffusing and storing the tone errors arising in the preset number of pixels.

It is also preferable that the diffusion range of diffusing the tone error into the non-processed pixels may selectively be changed over, based on the tone values of the preset number of pixels and results of the determination of the dot on-off state in the preset number of pixels as the condition relating to the determination of the dot on-off state.

For example, in the case where dots are created by chance in a specific area having small tone values of the image data to be expressed, diffusion of the tone errors arising due to creation of dots into a wider diffusion range effectively improves the dispersibility of dots and enhances the picture quality. In the case where dots are not created by chance in another specific area having large tone values of the image data, diffusion of the tone errors arising due to creation of no dots into a wider diffusion range also enhances the picture quality. In such cases, one preferably applicable procedure collectively diffuses the diffusion errors from the preset number of pixels into the first non-processed pixels included in the predetermined first area. In the case of creation or no creation of dots by chance, on the other hand, every time a tone error is calculated, the procedure diffuses the tone error into rather apart non-processed pixels that are not included in the predetermined first area. It is rare to diffuse the tone error into rather apart non-processed pixels. This arrangement thus effectively simplifies the process of determining the dot on-off state without practically lowering the processing speed.

In the first image processing apparatus and the corresponding image processing method discussed above, another preferable application calculates diffusion errors diffused to each non-processed pixel from tone errors arising in a plurality of adjoining pixels, which are specified as the preset number of pixels, and stores the calculated diffusion errors into the specific module assigned to the each non-processed pixel.

The adjoining pair of pixels with the tone errors arising therein have a wider overlap of the diffusion ranges of the respective tone errors, compared with no adjoining pixels. In the process of calculating the diffusion errors to be diffused into each non-processed pixel from the tone errors arising in the preset number of pixels and diffusing the calculated diffusion errors, when the preset number of pixels adjoin to each other, there are a greater number of non-processed pixels, to which the plurality of tone errors are collectively diffused. This arrangement thus desirably ensures the high-speed diffusion and storage of the tone errors. In such cases, any of diverse techniques discussed above may preferably be applied to diffuse and store the diffusion errors, which are calculated from the tone errors arising in the preset number of pixels, into each non-processed pixel.

In the first image processing apparatus or the corresponding first image processing method that calculates the diffusion errors based on the tone errors arising in a preset number of adjoining pixels, one preferable application determines the dot on-off state in each non-processed pixel by taking into account the calculated diffusion errors stored in the specific module assigned to the each non-processed pixel and a diffusion error diffusion from a pixel adjoining to the non-processed pixel.

This arrangement determines the dot on-off state in a specific non-processed pixel, which has an adjoining processed pixel that has already undergone determination of the dot on-off state, without storage and diffusion of the diffusion error diffused from the adjoining processed pixel into the specific non-processed pixel. This effectively ensures the high-speed determination of the dot on-off state.

At least part of the above and the other related objects is also attained by a second image processing apparatus that receives image data representing a tone value of each pixel, determines dot on-off state in each pixel by taking into account the tone value of the pixel, and converts the image data into a specific expression format based on the dot on-off state. The second image processing apparatus includes: a tone error storage unit that calculates a tone error arising in each pixel due to determination of the dot on-off state in the pixel, based on a result of the determination of the dot on-off state, and stores the calculated tone error in an error memory assigned to the each pixel; a tone error registration unit that registers the tone error in a temporally memory assigned to each processed pixel, which has already undergone the determination of the dot on-off state and is in a neighborhood of a current pixel of interest that is a current object of the determination of the dot on-off state; a dot creation decision unit that determines the dot on-off state in the current pixel of interest, based on the tone value of the current pixel of interest, by taking into account the tone error registered in the temporally memory assigned to the each processed pixel; and a tone error updating unit that detects processed pixels in a neighborhood of a next pixel of interest, which is a next object of the determination of the dot on-off state after the current pixel of interest, reads a tone error of a specific processed pixel, which is among the detected processed pixels and does not have the registered tone error in the temporally memory, from the error memory assigned each pixel, and updates a tone error that is not used for the determination of the dot on-off state in the next pixel of interest to the tone error read from the error memory, so as to cause the updated tone error to be used for the determination of the dot on-off state in the next pixel of interest.

There is a second image processing method corresponding to the second image processing apparatus discussed above. The present invention is accordingly directed to the second image processing method that receives image data representing a tone value of each pixel, determines dot on-off state in each pixel by taking into account the tone value of the pixel, and converts the image data into a specific expression format based on the dot on-off state. The second image processing method includes the steps of: calculating a tone error arising in each pixel due to determination of the dot on-off state in the pixel, based on a result of the determination of the dot on-off state, and storing the calculated tone error in an error memory assigned to the each pixel; registering the tone error in a temporally memory assigned to each processed pixel, which has already undergone the determination of the dot on-off state and is in a neighborhood of a current pixel of interest that is a current object of the determination of the dot on-off state; determining the dot on-off state in the current pixel of interest, based on the tone value of the current pixel of interest, by taking into account the tone error registered in the temporally memory assigned to the each processed pixel; detecting processed pixels in a neighborhood of a next pixel of interest, which is a next object of the determination of the dot on-off state after the current pixel of interest; and reading out a tone error of a specific processed pixel, which is among the detected processed pixels and does not have the registered tone error in the temporally memory, from the error memory assigned each pixel, and updating a tone error that is not used for the determination of the dot on-off state in the next pixel of interest to the read-out tone error, so as to cause the updated tone error to be used for the determination of the dot on-off state in the next pixel of interest.

In the second image processing apparatus and the corresponding second image processing method, the process registers the tone errors mapped to the respective processed pixels, and determines the dot on-off state in the current pixel of interest by taking into account the registered tone errors. The process detects processed pixels in the vicinity of the next pixel of interest and checks the detected processed pixels for a difference from the processed pixels in the vicinity of the current pixel of interest. The process then reads out the tone error stored in an error memory assigned to the processed pixel that is not used for determination of the dot on-off state in the current pixel of interest, and updates the tone error that is not used for determination of the dot on-off state in the next pixel of interest to the read-out tone error, thus causing the updated tone error to be used for the determination of the dot on-off state in the next pixel of interest.

In order to determine the dot on-off state in the next pixel of interest, the process is required to read out only the tone error, which is not used for determination of the dot on-off state in the current pixel of interest but is used for determination of the dot on-off state in the next pixel of interest, from an error memory assigned to each pixel. This arrangement desirably reduces the number of tone errors to be read out for the determination, thus effectively shortening the processing time required for the determination of the dot on-off state.

In the second image processing apparatus and the corresponding second image processing method, one preferable application temporarily registers a tone error arising in the current pixel of interest, and updates the tone error that is not used for the determination of the dot on-off state in the next pixel of interest to the temporarily registered tone error.

This arrangement enables determination of the dot on-off state in the next pixel of interest without reading out the stored tone error in the current pixel of interest, thus ensuring high-speed determination of the dot on-off state.

Either of the first image processing apparatus and the second image processing apparatus is favorably applied for a print control apparatus, which outputs print data for controlling creation of ink dots to a printing device that creates ink dots on a printing medium to print an image, so as to control the printing device. Each of the first image processing apparatus and the second image processing apparatus receives image data representing the tone value of each pixel and quickly converts the image data into the specific expression format based on the dot on-off state. Application of either the first image processing apparatus or the second image processing apparatus to the print control apparatus ensures high-speed conversion of the image data into print data. The converted print data is output to the printing device, which then prints a high-quality image at a high speed.

The technique of the present invention may also be attained by a computer, which executes a program for actualizing either of the first image processing method and the second image processing method discussed above. Another application of the present invention is thus recording media corresponding to the first image processing method and the second image processing method.

The present invention is accordingly directed to a recording medium in which a program is recorded in a computer readable manner. The program actualizes a method that receives image data representing a tone value of each pixel, determines dot on-off state in each pixel by taking into account the tone value of the pixel, and converts the image data into a specific expression format based on the dot on-off state. The program causes a computer to attain the functions of: calculating a tone error arising in each pixel due to determination of the dot on-off state in the pixel, based on a result of the determination of the dot on-off state, and temporarily registering the calculated tone error in a temporally memory; calculating diffusion errors diffused to each of non-processed pixels, which are in a neighborhood of a preset number of pixels and have not yet been subjected to the determination of the dot on-off state, based on the temporarily registered tone errors arising in the preset number of pixels; storing the calculated diffusion errors into an error memory assigned to the each non-processed pixel; and determining the dot on-off state in each non-processed pixel, based on the tone value of the each non-processed pixel included in the image data, by taking into account the calculated diffusion errors mapped to the each non-processed pixel. This recording medium corresponds to the first image processing method.

The present invention is also directed to another recording medium in which a program is recorded in a computer readable manner. The program actualizes a method that receives image data representing a tone value of each pixel, determines dot on-off state in each pixel by taking into account the tone value of the pixel, and converts the image data into a specific expression format based on the dot on-off state. The program causes a computer to attain the functions of: calculating a tone error arising in each pixel due to determination of the dot on-off state in the pixel, based on a result of the determination of the dot on-off state, and storing the calculated tone error in an error memory mapped to the pixel; registering a tone error in a temporally memory assigned to the each processed pixel, which has already undergone the determination of the dot on-off state and is in a neighborhood of a current pixel of interest that is a current object of the determination of the dot on-off state; determining the dot on-off state in the current pixel of interest, based on the tone value of the current pixel of interest, by taking into account the tone error registered in the each processed pixel; detecting processed pixels in a neighborhood of a next pixel of interest, which is a next object of the determination of the dot on-off state after the current pixel of interest; and reading out a tone error of a specific processed pixel, which is among the detected processed pixels and does not have the registered tone error, and updating a tone error that is not used for the determination of the dot on-off state in the next pixel of interest to the read-out tone error, so as to cause the updated tone error to be used for the determination of the dot on-off state in the next pixel of interest. This recording medium corresponds to the second image processing method.

The computer reads the program recorded in either of such recording media to attain the diverse functions discussed above, thus ensuring high-speed conversion of the image data representing the tone value of each pixel into the specific expression format based on the dot on-off state.

These and other objects, features, aspects, and advantages of the present invention will become more apparent from the following detailed description of the preferred embodiments with the accompanying drawings.

BRIEF DESCRIPTION OF THE DRAWINGS

FIG. 6 shows some settings of error diffusion coefficients used for error diffusion into respective pixels;

FIG. 19 shows the settings of weighting factors allocated to the respective pixels in the tone number conversion process of the fourth embodiment.

DESCRIPTION OF THE PREFERRED EMBODIMENTS

In order to further elucidate the functions, the effects, and the advantages of the present invention, several embodiments of the present invention are discussed below in the following sequence:

A. General Flow of Processing

B. First Embodiment
B-1. Construction of System
B-2. Outline of Image Data Conversion Process
B-3. Tone Number Conversion Process in First Embodiment
B-4. Modification C. Second Embodiment
C-1. Principles of Shortening Time Required for Tone Number Conversion Process in Second Embodiment
C-2. Tone Number Conversion Process in Second Embodiment
C-3. Modification D. Third Embodiment E. Fourth Embodiment
E-1. Principles of Shortening Time required for Tone Number Conversion Process in Fourth Embodiment E-2. Tone Number Conversion Process in Fourth Embodiment

A. General Flow of Processing

Figure 1:
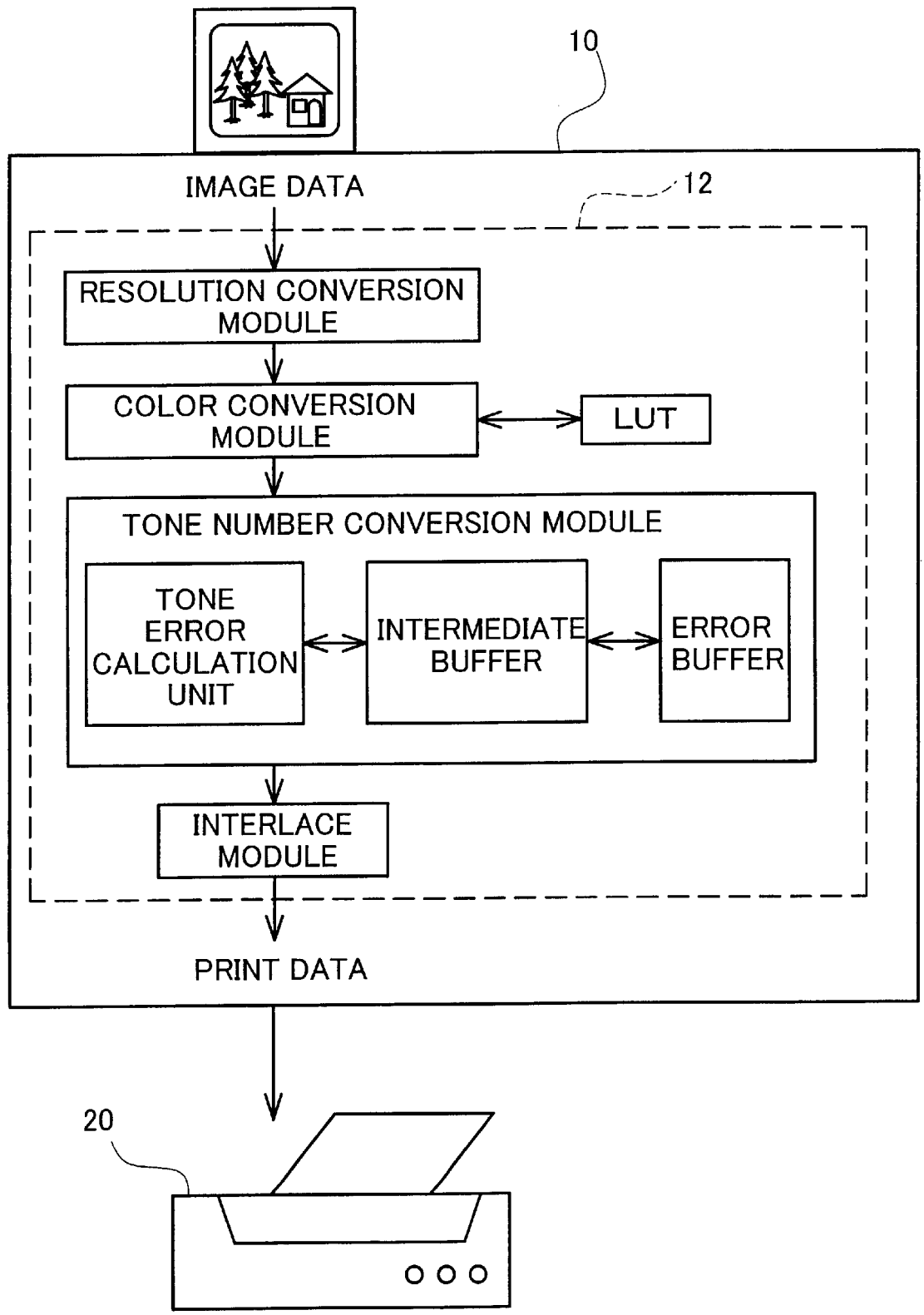
FIG. 1 is an explanatory view showing the general flow of processing executed in a printing system of the present invention.

Referring to FIG. 1, the general flow of processing carried out in the present invention is discussed below. FIG. 1 is an explanatory view showing the general flow of processing executed in a printing system of the present invention. The printing system includes a computer 10 as an image processing apparatus and a color printer 20. The computer 10 receives tone image data of a color image from an image device like a digital camera or a color scanner, and converts the input image data into print data expressed by the dot on-off state of respective colors printable with the color printer 20. A specific program called a printer driver 12 is used for the conversion of image data. The computer 10 may create the tone image data of the color image with a diversity of application programs.

The printer driver 12 has a multiple of modules, such as a resolution conversion module, a color conversion module, a tone number conversion module, and an interlace module. The tone number conversion module converts tone image data into a specific expression format based on the dot on-off state. Series of processing carried out by the other modules will be discussed later. The color printer 20 creates dots of respective color inks on a printing medium, based on resulting print data that have undergone the conversions by the respective modules, so as to print a color image.

As illustrated in FIG. 1, the tone number conversion module in the printing system of the present invention has an intermediate buffer interposed between a tone error calculation unit and an error buffer. The use of the intermediate buffer enables high-speed determination of the dot on-off state.

In the case where tone data is expressed by the dot on-off state, errors of tone expression generally arise in the respective pixels. The error diffusion method or the least mean square error method described previously accumulates the arising tone errors in a large-capacity error buffer, which is provided in part of a main storage area. The method reads a total error accumulated in each pixel from the error buffer and determines the dot on-off state of the pixel by taking into account the value of the accumulated total error. As clearly understood from this procedure, frequent reading and writing operations of data from and into the error buffer are required for accurate determination of the dot on-off state. A large-capacity buffer is applied for the error buffer, so that the process of reading and writing data from and into the error buffer requires some time. Frequent reading and writing operations thus undesirably take a long time.

The tone number conversion module in the printing system of the present invention utilizes the intermediate buffer having the smaller capacity than that of the error buffer and thereby reduces the reading and writing frequencies from and into the error buffer, as discussed later in detail. The intermediate buffer has the small-capacity area that is repeatedly read and written, and is thus more readily read and written at a higher speed than the error buffer. For example, in a computer system having a cache memory that is interposed between a main memory and a CPU and allows higher-speed reading and writing operations than the main memory, in the case of reading data from the intermediate buffer, it is expected to read data mostly from the cache memory. In this manner, the intermediate buffer naturally allows higher-speed reading and writing operations than the error buffer, without any special consideration.

In the case where the CPU has marginal registers, at least part of the intermediate buffer may be allocated to the registers, which allow still higher-speed reading and writing operations than the cache memory. This further enhances the processing speed. Allocation of part of the intermediate buffer to the registers of the CPU may be attained by explicit specification with source codes of the processing software, for example, by taking advantage of the register declaration in C language. Some of compilers having high optimization capability have the function of automatically allocating marginal registers to frequently-used variables. Such a compiler enables part of the intermediate buffer to be allocated to the marginal registers of the CPU without any explicit specification.

In the general computer system, the small-capacity intermediate buffer, which is repeatedly read and write, ensures high-speed reading and writing operations without any special consideration as described above. In the case of hardware-based processing instead of the software-based processing, the presence of the small-capacity intermediate buffer readily actualizes construction that allows high-speed reading and writing operations.

Since each process of reading or writing data from or into the error buffer takes some time, reduction of the reading and writing frequencies from and into the error buffer desirably ensures the higher-speed determination of the dot on-off state. The processing logically equivalent to the known error diffusion method or least mean square error method is carried out in the system utilizing the intermediate buffer. The system with the intermediate buffer accordingly ensures the equivalent picture quality of the resulting processed images. There are a diversity of applications using the intermediate buffer to reduce the reading and writing frequencies from and into the error buffer. These diverse applications are discussed below as preferred embodiments of the present invention.

B. First Embodiment
B-1. Construction of System

Figure 2:
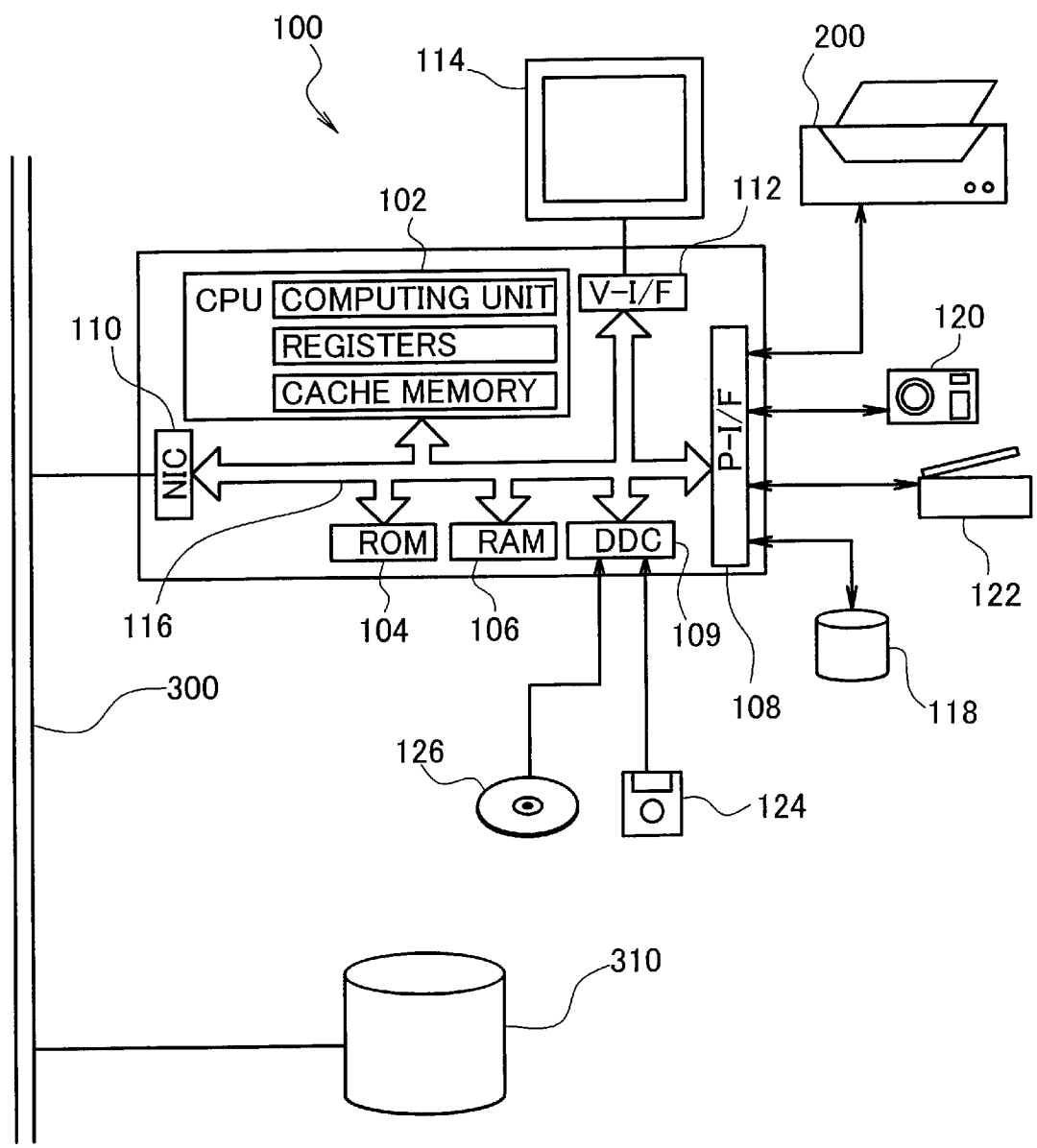
FIG. 2 schematically illustrates the construction of a computer as an image processing apparatus in a first embodiment of the present invention.

FIG. 2 schematically illustrates the construction of a computer 100 as an image processing apparatus in a first embodiment. The computer 100 has a known structure including a CPU 102, a ROM 104, and a RAM 106 that are mutually connected via a bus 116. The CPU 102 has a computing unit that actually executes processing and a plurality of registers that temporarily keep data being processed. The data kept in the registers can be processed at a significantly higher speed than data stored in the RAM 106. A special storage element called a cache memory may be applied, in place of the registers. The cache memory allows higher-speed reading and writing operations of data than the RAM 106, although not so high as the register. The cache memory can treat a greater quantity of data than the register.

The computer 100 is connected to a disk controller DDC 109 for reading data from a floppy disk 124 and a compact disc 126, a peripheral equipment interface P-I/F 108 for transmission of data to and from peripheral equipment, and a video interface V-I/F 112 for driving a CRT 114. A color printer 200 (discussed later) and a hard disk 118 are connected to the P-I/F 108. Connection of a digital camera 120 or a color scanner 122 to the P-I/F 108 enables images taken in with the digital camera 120 or the color scanner 122 to be printed. Attachment of a network interface card NIC 110 allows the computer 100 to be connected to a communication line 300 and fetch data stored in a storage device 310 connected to the communication line.

Figure 3:
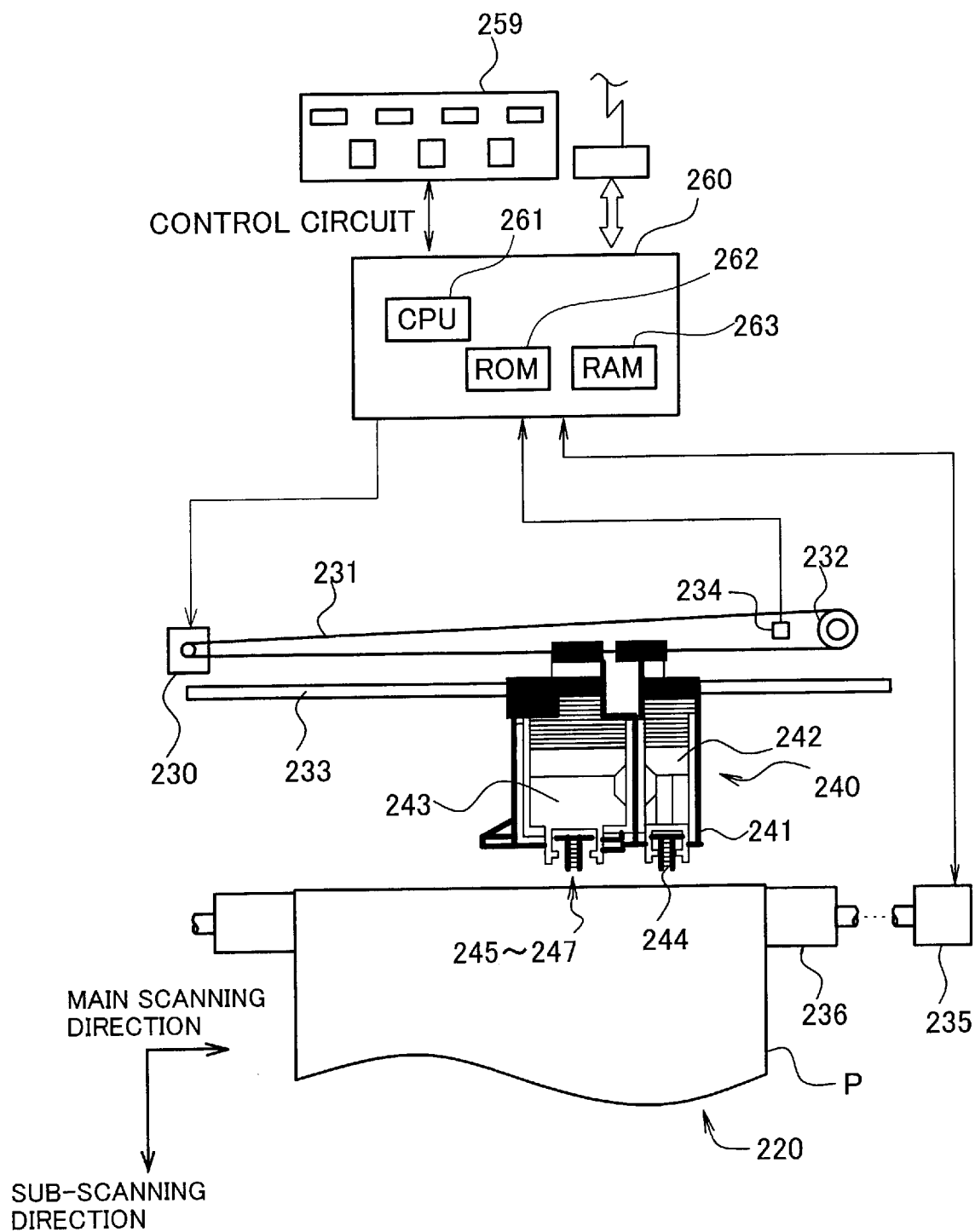
FIG. 3 schematically illustrates the structure of a color printer as an image display device of the first embodiment.

FIG. 3 schematically illustrates the structure of the color printer 200 in the first embodiment. The color printer 200 is an ink jet printer that is capable of creating dots of four different color inks, that is, cyan, magenta, yellow, and black. The ink jet printer may be capable of creating dots of six different color inks, that is, light cyan ink having a lower dye density and light magenta ink having a lower dye density, in addition to the above four color inks. In the description below, the cyan ink, the magenta ink, the yellow ink, the black ink may respectively be referred to as the C ink, the M ink, the Y ink, and the K ink.

The color printer 200 has a mechanism of driving a print head 241 mounted on a carriage 240 to eject ink and create dots, a mechanism of activating a carriage motor 230 to move the carriage 240 back and forth along an axis of a platen 236, a mechanism of activating a sheet feed motor 235 to feed a sheet of printing paper P, and a control circuit 260 of controlling the creation of dots, the movement of the carriage 240, and the feed of the printing paper P.

An ink cartridge 242 for keeping therein the K ink and an ink cartridge 243 for keeping therein the C ink, the M ink, and the Y ink are attached to the carriage 240. The attachment of the ink cartridges 242 and 243 to the carriage 240 causes each ink kept in the ink cartridge to be led through an ink conduit (not shown) and supplied to each of ink ejection heads 244 through 247, which correspond to the respective color inks and are disposed on the lower face of the print head 241. One nozzle array including 48 nozzles, which are arranged at a fixed nozzle pitch k, is formed in each of the ink ejection heads 244 through 247.

The control circuit 260 includes a CPU 261, a ROM 262, and a RAM 263. The control circuit 260 causes ink droplets to be ejected from the respective nozzles at adequate timings, based on the print data transmitted from the computer 100, while controlling the operations of the carriage motor 230 and the sheet feed motor 235 to control main scan and sub-scan of the carriage 240. The color printer 200 creates ink dots of the respective colors at adequate positions on the printing medium under the control of the control circuit 260, thereby printing a color image.

A diversity of known techniques may be applied to eject ink droplets from each ink ejection head. One technique uses piezoelectric elements for ink ejection. Another technique uses a heater disposed in each ink conduit to produce bubbles in the ink conduit and thereby cause ejection of ink droplets. The technique of the present invention is not restricted to the ink ejection-type printers. The color printer 200 may apply thermal transfer or another equivalent technique to create ink dots on the printing medium, or utilize static electricity to make toner powder of each color adhere onto the printing medium.

The color printer 200 may be a variable dot printer that regulates the size of ink droplets ejected from each ink ejection head or regulates the number of small ink droplets ejected simultaneously, so as to adjust the size of ink dots created on the printing medium.

B-2. Outline of Image Data Conversion Process

Figure 4:
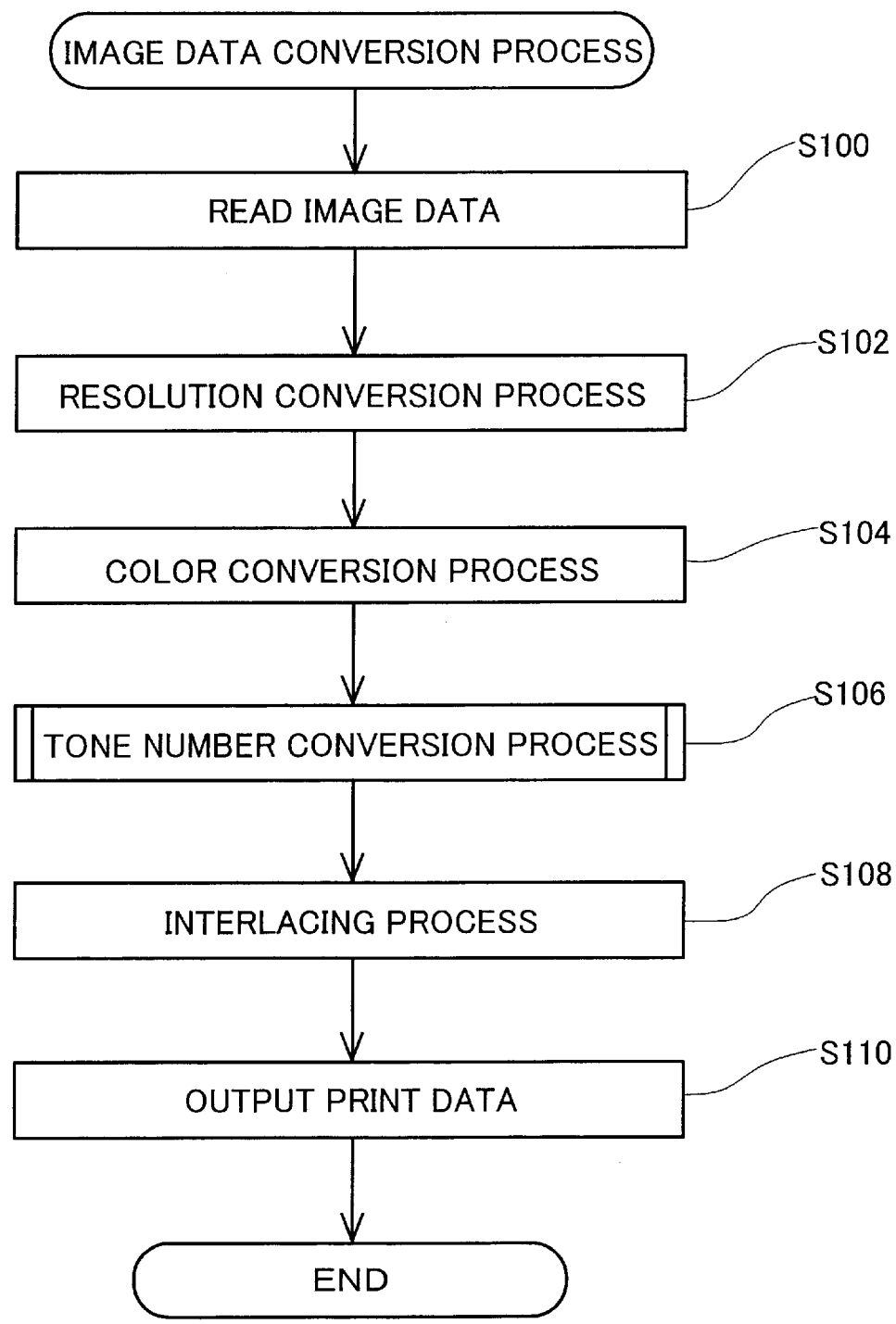
FIG. 4 is a flowchart showing an image data conversion routine executed in the image processing apparatus of the embodiment.

FIG. 4 is a flowchart showing an image data conversion routine. The computer 100 as the image processing apparatus of the first embodiment causes input image data to undergo a predetermined series of image processing, thus converting the image data into print data. The operating system of the computer 100 activates the printer driver to start this processing routine. The image data conversion process of the first embodiment is discussed briefly with reference to the flowchart of FIG. 4.

When entering the image data conversion routine, the printer driver first reads RGB color image data, which is the object of conversion at step S100, and converts the resolution of the input image data into a printing resolution set for printing with the color printer 200 at step S102. When the resolution of the input color image data is lower than the printing resolution, the process performs linear interpolation to generate new data between existing image data and thereby convert the resolution of the input image data into the printing resolution. When the resolution of the input color image data is higher than the printing resolution, on the contrary, the process skips existing image data at a specified rate to convert the resolution of the input image data into the printing resolution.

After the conversion of the resolution, the printer driver carries out color conversion of the color image data at step S104. The color conversion process converts color image data expressed by combinations of tone values of R, G, and B into image data expressed by combinations of tone values of the respective colors, such as C, M, Y, and K, used in the color printer 200. The color conversion process is quickly performed by referring to a three-dimensional mathematical table called a color conversion table (LUT).

When the color conversion is completed, the printer driver carries out tone number conversion at step S106. The tone number conversion process is carried out in the following manner. The color-converted tone data is expressed as data having a 256 tone range with regard to each color. The color printer 200 of the embodiment takes only either of the dot on state and the dot off state. Namely the color printer 200 of the embodiment is capable of expressing only two tones locally. It is accordingly required to convert image data of 256 tones into image data of two tones expressible by the color printer 200. This process of converting the number of tones is the tone number conversion. As described previously, the structure of the embodiment utilizes the intermediate buffer to quickly determine the dot on-off state. The details of the tone number conversion will be discussed later.

On completion of the tone number conversion, the printer driver carries out interlacing at step S108. The interlacing process rearranges the tone number-converted image data representing the dot on-off state in a specific order to be transferred to the color printer 200 by taking into account the order of dot creation. The printer driver outputs resulting image data obtained by the interlacing process as print data to the color printer 200 at step S110. The color printer 200 creates ink dots of the respective colors on a printing medium according to the input print data, so that a color image corresponding to the image data is printed on the printing medium.

The following describes the process of quickly determining the dot on-off state by utilizing the intermediate buffer for the tone number conversion process in the first embodiment.

B-3. Tone Number Conversion Process in First Embodiment

The procedure of determining the dot on-off state according to the error diffusion method is described briefly, prior to description of the principles of utilizing the intermediate buffer to shorten the processing time required for determination of the dot on-off state.

Figure 5A:
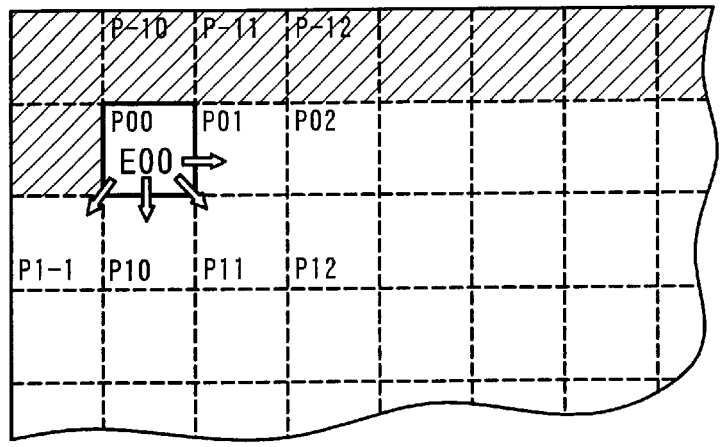
FIG. 5 conceptually shows a process of determining the dot on-off state according to the error diffusion method.

FIG. 5 conceptually shows a process of determining the dot on-off state in each pixel while diffusing tone errors arising in processed pixels, which have already undergone determination of the dot on-off state, into peripheral pixels. In the description below, a pixel that is the current object of determination of the dot on-off state is called a pixel of interest. As shown in FIG. 5(a), the determination of the dot on-off state in a pixel P00 (pixel of interest) results in generating a tone error E00 as a difference from the tone value of the image data with regard to the pixel of interest. Hatched squares represent processed pixels that have already undergone determination of the dot on-off state. The error diffusion method multiplies the tone error E00 by predetermined weighting factors (error diffusion coefficients) and diffuses the resulting values into peripheral non-processed pixels in a neighborhood of the pixel of interest. In the discussion below, the subscript '00' represents the pixel of interest, the subscript '01' represents a pixel right adjoining to the pixel of interest, and the subscript '0-1' represents a pixel left adjoining to the pixel of interest. The subscript '10' represents a pixel immediate below the pixel of interest, subscript '-10' represents a pixel immediately above the pixel of interest. The subscript '11' is the combination of the subscripts '10' and '01' and represents a pixel off to the lower right of the pixel of interest.

FIG. 6 shows some settings of error diffusion coefficients used for diffusion of tone errors. The hatched square in FIG. 6 represents the position of the pixel of interest. The matrix consisting of error diffusion coefficients from the pixel of interest to peripheral pixels is referred to as the error diffusion matrix. For example, in the error diffusion matrix of FIG. 6(a), a value '¼' is set to an error diffusion coefficient K01 in a pixel right adjoining to the pixel of interest. This error diffusion matrix causes an error division, ¼ of the tone error arising in the pixel of interest, to be distributed to the pixel right adjoining to the pixel of interest. In a similar manner, error divisions, each ¼ of the tone error arising in the pixel of interest, are distributed to a pixel off to the lower left of the pixel of interest, a pixel immediately below the pixel of interest, and a pixel off to the lower right of the pixel of interest. The error diffusion matrix is not restricted to the settings shown in FIG. 6. The range of error diffusion and the error diffusion coefficients may be set arbitrarily. The actual error diffusion method specifies an adequate error diffusion matrix to ensure the favorable picture quality of resulting images. For simplicity of explanation, the error diffusion matrix of FIG. 6(a), which has the narrowest range of error diffusion among all the error diffusion matrixes shown in FIG. 6, is used for the error diffusion procedure.

When the error diffusion matrix of FIG. 6(a) is used, the tone error E00 arising in the pixel of interest P00 is distributed by each ¼ error division of the tone error E00 into a total of four pixels, a pixel P01 right adjoining to the pixel of interest, a pixel P1-1 off to the lower left of the pixel of interest, a pixel 10 immediately below the pixel of interest, and a pixel P11 off to the lower right of the pixel of interest. The error divisions (diffused errors) distributed to the respective peripheral pixels in the vicinity of the pixel of interest are stored independently of one another. The diffused errors are accordingly registered in the large-capacity RAM 106 (see FIG. 2) that has the capacity of storing diffused errors with regard to a large number of pixels.

Figure 5B:
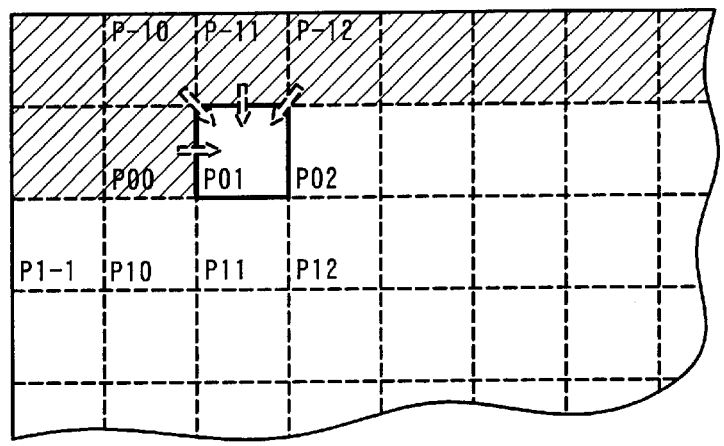
Figure 5C:
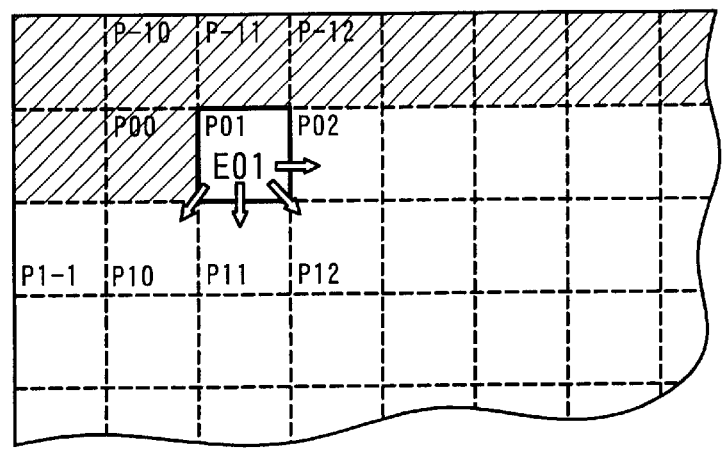

After the diffusion of the tone error arising in the pixel P00 into the peripheral pixels, the procedure determines the dot on-off state in a new pixel of interest P01, that is, the pixel P01 right adjoining to the previous pixel of interest. FIG. 5(b) conceptually shows the process of determining the dot on-off state in the new pixel of interest P01. The dot on-off state determination process first reads a total of the diffused errors distributed from the peripheral pixels and accumulated in the pixel of interest P01 and corrects the image data in the pixel of interest P01 with the total of the diffused errors. As shown in FIG. 5(b), error divisions diffused from four peripheral processed pixels P-10, P-11, P-12, and P00, which have already undergone determination of the dot on-off state, according to the error diffusion matrix are accumulated in the pixel of interest P01. The process reads the total of the diffused errors from the RAM 106, corrects the image data in the pixel of interest P01 with the total of diffused errors, and compares the resulting corrected value with a predetermined threshold value, so as to determine the dot on-off state in the pixel of interest P01. The details of the determination of the dot on-off state will be discussed later. The determination of the dot on-off state in the pixel of interest P01 results in generating a tone error E01 in the pixel P01. The newly arising tone error E01 is then diffused to peripheral non-processed pixels according to the error diffusion matrix. The error diffusion method determines the dot on-off state in a current pixel of interest, while diffusing a tone error arising in the current pixel of interest into a plurality of peripheral non-processed pixels. This leads to frequent operations of reading and writing data from and into the RAM 106, thus undesirably extending the processing time required for determination of the dot on-off state.

The tone number conversion process of this embodiment utilizes the intermediate buffer to shorten the processing time required for determination of the dot on-off state. FIG. 7 shows the principles of utilizing the intermediate buffer to shorten the processing time required for determination of the dot on-off state. The first embodiment uses registers incorporated in the CPU 102 for the intermediate buffer. As discussed previously, the registers allow higher-speed processing than the RAM 106. A cache memory may replace the registers to execute the practically equivalent processing. The principles of shortening the processing time required for determination of the dot on-off state in the first embodiment are discussed below with referring to FIG. 7.

Figure 7A:
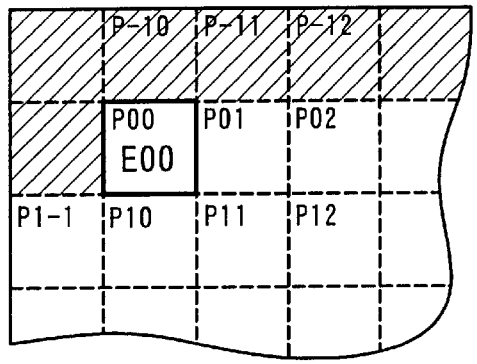
FIG. 7 shows the principles of shortening the processing time in a tone number conversion process of the first embodiment.

FIG. 7(a) shows the process of determining the dot on-off state in a pixel of interest P00. The determination of the dot on-off state in the pixel of interest P00 results in generating a tone error E00 in the pixel P00. Six rectangles shown on the right side of FIG. 7(a) schematically represent six registers used for the intermediate buffer. For convenience of explanation, the respective registers are distinguished from one another by symbols R01, R02, R1-1, R10, R11, and R12. The tone number conversion process of the first embodiment does not directly store the diffused errors or divisions of the tone error E00 arising in the pixel of interest P00 in the RAM 106, but temporarily registers the diffused errors in the registers. The value in the register R01 is updated to an error division to be distributed to the pixel P01 right adjoining to the pixel of interest P00. The error division to be distributed to the pixel P01 is calculated as K01×E00 according to the error diffusion matrix. In a similar manner, the value in the register R1-1, the value in the register R10, and the value in the register R11 are respectively updated to error divisions to be distributed to the pixel P1-1 off to the lower left of the pixel of interest P00, the pixel P10 immediately below the pixel of interest P00, and the pixel P11 off to the lower right of the pixel of interest P00. The respective error divisions are calculated as K1-1×E00, K10×E00, and K11×E00 according to the error diffusion matrix.

After updating the values of the corresponding four registers to the diffused errors or error divisions to be distributed to the peripheral four pixels, the process determines the dot on-off state in the new pixel of interest P01, which is the pixel right adjoining to the previous pixel of interest P00. For the determination of the dot on-off state in the pixel P01, the process reads the diffused errors with regard to the new pixel of interest P01 from the RAM 106 and corrects the tone data in the pixel of interest P01 with the total of the read-out diffused errors and the error division stored in the register R01. Correction of the tone data with the sum of the diffused errors of the pixel of interest P01 and the error division stored in the register R01 is practically identical with the general error diffusion method. The general error diffusion method diffuses a tone error arising in each pixel into peripheral pixels as described previously with FIG. 5. The method reads the total of diffused errors distributed to the new pixel of interest P01, corrects the tone data in the pixel P01 with the total of diffused errors, and determines the dot on-off state in the pixel P01 based on the correction. In the structure of this embodiment, on the other hand, the diffused error or error division distributed to the pixel P01 is stored in the register R01 as shown in FIG. 7(a). The procedure of this embodiment corrects the tone data in the pixel of interest P01 with the sum of the diffused errors of the pixel P01 and the error division stored in the register R01, thus attaining the practically identical process with the general error diffusion method. The determination of the dot on-off state in the new pixel of interest P01 results in generating a new tone error E01 in the pixel of interest (see FIG. 7(b)).

Figure 7B:
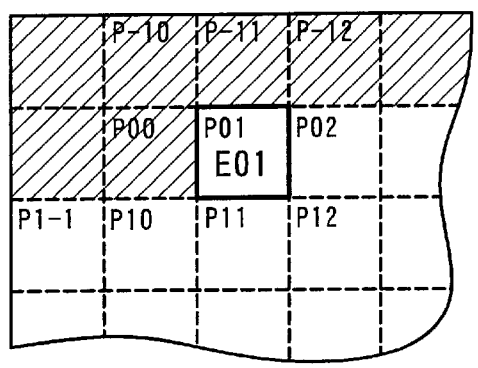

Like the tone error E00 arising in the pixel P00, the tone error E01 arising in the pixel P01 is diffused to the corresponding registers with the factors set in the error diffusion matrix. This process is described concretely with reference to FIG. 7(b). The pixel P02 is right adjoining to the new pixel of interest P01. The value in the corresponding register R02 is updated to a value K01×E01 obtained by multiplying the tone error E01 by the error diffusion coefficient K01 set in the error diffusion matrix. The pixel P10 is off to the lower left of the pixel of interest P01. The value K1-1×E01 obtained by multiplying the tone error E01 by the error diffusion coefficient K1-1 is added to the value of the corresponding register R10. As shown in FIG. 7(b), the error division K10×E00 diffused from the pixel P00 has already been stored in the register R10. The newly diffused error division is thus added to the existing error division on the register R10. The value in the register R10 is accordingly updated to the sum of the error divisions diffused from the two processed pixels (K10×E00+K1-1×E01). In a similar manner, with regard to the pixels P11 and P12, the values in the corresponding registers R11 are updated respectively to the sum of error divisions or diffused errors (K11×E00+K10×E01) and an error division K11×E01.

Figure 7C:
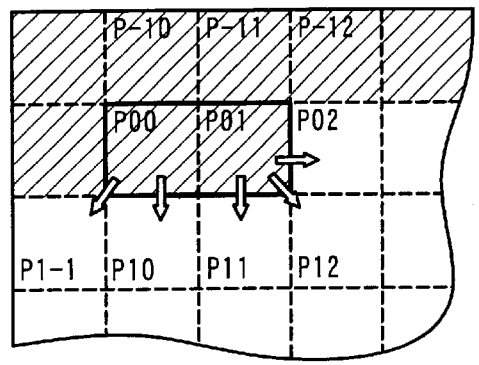

The above series of processing causes the tone error E00 arising in the pixel P00 and the tone error E01 arising in the pixel P01 to be diffused to the corresponding registers. The error divisions stored in the respective registers are then written into error buffer modules allocated to the peripheral pixels (in the RAM 106) as shown in FIG. 7(c). The value K01×E00 stored in the register R02 is added to the error buffer module assigned to the pixel P02. The value K1-1×E00 stored in the register R1-1 is added to the error buffer module assigned to the pixel P1-1. The value (K10×E00+K1-1×E01) stored in the register R10 is added to the error buffer module assigned to the pixel P10. The value (K11×E00+K10×E01) stored in the register R11 is added to the error buffer module assigned to the pixel P11. The value K11×E01 stored in the register R12 is added to the error buffer module assigned to the pixel P12. This process diffuses the error divisions to the error buffer modules assigned to the peripheral five pixels, as in the case of diffusing error divisions of the tone errors E00 and E01 arising in the pixels P00 and P01 according to the general error diffusion method (see FIG. 5(c)). The pixel P01 has already undergone the determination of the dot on-off state, and it is not required to diffuse the value in the register R01 to the error buffer module assigned to the pixel P01 in the RAM 106. The method of this embodiment determines the dot on-off state with regard to two pixels and diffuses divisions of tone errors arising in the two pixels into error buffers assigned to peripheral five pixels. Namely the rate of determination of the dot on-off state to diffusion of error divisions into error buffer modules is 1 to 2.5 pixels.

In the above description, as a matter of convenience, the procedure temporarily stores all the error divisions diffused into peripheral five pixels in the vicinity of two pixels of interest, which are the object of binarization, in the registers, sums up the error divisions diffused from the two pixels on the respective registers, and then diffuses the calculated error divisions to the corresponding error buffer modules. With regard to the pixels that do not require summation of the error divisions on the registers, for example, the pixels P1-1, P02, and P12, the error divisions may directly be diffused to the corresponding error buffer modules.

The general error diffusion method shown in FIG. 5 diffuses divisions of a tone error arising in each pixel, which is the current object of determination of the dot on-off state, into peripheral four pixels. The procedure of this embodiment, on the other hand, sums up error divisions diffused from a plurality of pixels into a non-processed pixel on the corresponding register, and diffuses the sum of the error divisions to the error buffer module assigned to the pixel. This procedure requires diffusion of error divisions into error buffer modules assigned to 2.5 pixels on every occasion of determining the dot on-off state in 1 pixel. This procedure has the additional step of distributing error divisions into respective registers, in addition to the general error diffusion method. The process of updating the value in the register and summing up the error divisions on the register is implemented at a remarkably higher speed than the process of diffusing error divisions into the RAM. The procedure of this embodiment thus significantly shortens the total time required for determination of the dot on-off state. The embodiment uses the registers for the intermediate buffer. The intermediate buffer is, however, not restricted to the registers, but may be any storage means that allows higher-speed reading and writing operations than the storage means applied for the error buffer. The practically equivalent effects may be exerted by utilizing a cache memory, which is provided for high-speed transmission of data between the CPU and the RAM. The intermediate buffer adopted in this embodiment has the small-capacity memory area, which is repeatedly used for processing in the respective pixels. The intermediate buffer is thus automatically allocated to the registers of the CPU or the cache memory to allow high-speed reading and writing operations by the functions of the compiler and the CPU without any explicit specification by the designer.

In the above description, the error divisions diffused from two pixels are directly summed up on the register. One possible modification may temporarily store the diffused error divisions in separate registers and sum up the error divisions on another register. For example, with regard to the error divisions diffused to the pixel P10 in FIG. 7(b), the procedure of the above embodiment updates the value in the register R10 to the error division K10×E00 diffused from the pixel P00 and subsequently adds the error division K1-1×E01 diffused from the pixel P01 on the register R10. The modified procedure respectively stores the error divisions diffused from the pixels P00 and P01 in separate registers Ra and Rb and sums up the values in the two registers Ra and Rb on the register R10.

Figure 8:
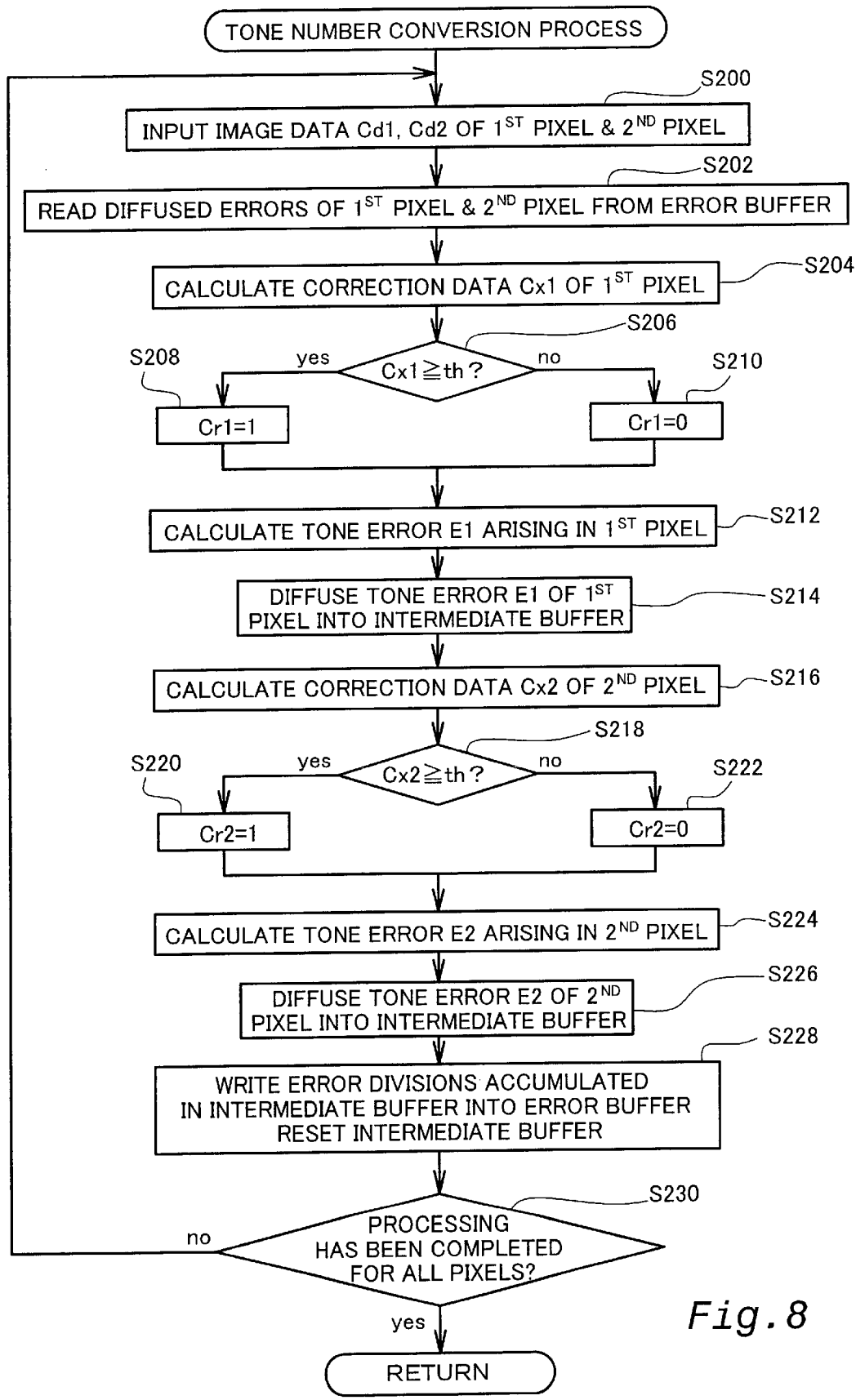
FIG. 8 is a flowchart showing the general flow of the tone number conversion process executed in the first embodiment.

FIG. 8 is a flowchart showing the tone number conversion process of the first embodiment discussed above. This processing routine is executed by the CPU 102 in the computer 100. As mentioned previously, the color printer 200 of this embodiment is capable of creating ink dots of four different colors C, M, Y, and K. The tone number conversion process shown in FIG. 8 is thus actually carried out for each color. For simplicity of explanation, the following description of the processing routine does not specify the color of ink dots. The color printer 200 may alternatively be capable of creating ink dots of six different colors, LC and LM in addition to the above four colors.

As mentioned previously, the variable dot printer that is capable of creating dots of different sizes with regard to each color may be applied for the color printer 200 of this embodiment. The tone number conversion process discussed below is carried out for each dot size in the variable dot printer, which is capable of creating variable-sized dots, for example, a large-sized dot, a medium-sized dot, and a small-sized dot.

The increased number of ink colors or the increased number of different dot sizes used in the color printer enhances the frequency of the tone number conversion process and thereby tends to lengthen the processing time. The tone number conversion process of this embodiment discussed below allows high-speed processing and is thus favorably applied for such color printers.

When the program enters the tone number conversion routine of this embodiment, the CPU 102 first reads image data Cd1 and Cd2 with regard to two pixels, which are the object of determination of the dot on-off state at step S200. As a matter of convenience, the left pixel is called the first pixel, and the right pixel is called the second pixel. The image data is stored in the RAM 106 incorporated in the computer 100. The CPU 102 subsequently reads diffused errors Ed1 and Ed2 diffused to and accumulated in the first pixel and the second pixel from the corresponding error buffer modules, which are present on the RAM 106, at step S202.

The CPU 102 then sums up the image data Cd1 of the first pixel and the diffused error Ed1 of the first pixel, so as to calculate correction data Cx1 of the first pixel at step S204. The calculated correction data Cx1 is compared with a preset threshold value th at step S206. When the correction data Cx1 is not smaller than the preset threshold value th, the CPU 102 determines creation of a dot in the first pixel and writes a value '1' representing the dot on state into a variable Cr1 showing the result of determination with regard to the first pixel at step S208. Otherwise the CPU 102 determines creation of no dot in the first pixel and writes a value '0' representing the dot off state into the variable Cr1 at step S210.

After the determination of the dot on-off state with regard to the first pixel, the CPU 102 calculates a tone error E1 arising in the first pixel due to the determination at step S212. The tone error E1 arising in the first pixel is calculated by subtracting the tone value expressed by creation of a dot or creation of no dot in the first pixel (hereinafter such a tone value is referred to as the resulting value) from the correction data Cx1 of the first pixel.

The CPU 102 subsequently diffuses the tone error E1 arising in the first pixel to the intermediate buffer at step S214. This corresponds to the series of processing discussed above with reference to FIG. 7(*a*). The error diffusion process multiplies the tone error E1 arising in the first pixel by error diffusion coefficients set in a specified error diffusion matrix to calculate diffused errors or error divisions to be diffused to peripheral pixels, and stores the calculated error divisions or diffused errors into corresponding modules of the intermediate buffer.

After diffusion of the tone error E1 arising in the first pixel to the intermediate buffer, the CPU 102 starts determination of the dot on-off state in the second pixel. The calculated correction data of the second pixel is required for determination of the dot on-off state in the second pixel. The CPU 102 thus sums up the image data Cd2 of the second pixel, the diffused error Ed2 of the second pixel, and the error division diffused from the first pixel to the second pixel, so as to calculate correction data Cx2 of the second pixel at step S216. As discussed previously with reference to FIG. 7, the error division diffused from the first pixel to the second pixel is registered in a preset module of the intermediate buffer. The procedure of the embodiment shown in FIG. 8 reads the image data and the diffused error of the second pixel, simultaneously with the image data and the diffused error of the first pixel. One modified procedure may read the image data and the diffused error of the second pixel when such data are required for calculation of the correction data. In the case of simultaneously reading the image data and the diffused errors with regard to the first pixel and the second pixel, a preferred application reads such data from continuous positions on the memory, which attains high-speed reading.

The image data and the diffused error of the second pixel, which are respectively read at steps S200 and S202 in the above processing routine, may be read immediately before the processing at step S216. This modification is favorable when the CPU 102 has a restricted number of registers, since the registers may be used for other purposes until the image data and the diffused error of the second pixel are read.

After the calculation of the correction data Cx2 of the second pixel at step S216, as in the case of the first pixel, the CPU 102 compares the calculated correction data Cx2 with the preset threshold value th to determine the dot on-off state at step S218. When the correction data Cd2 is not smaller than the preset threshold value th, the CPU 102 determines creation of a dot in the second pixel and writes the value '1' representing the dot on state into a variable Cr2 showing the result of determination with regard to the second pixel at step S220. Otherwise the CPU 102 determines creation of no dot in the second pixel and write the value '0' representing the dot off state into the variable Cr2 at step S222. The CPU 102 subsequently calculates a tone error E2 arising in the second pixel due to the determination at step S224. Like the tone error E1 arising in the first pixel, the tone error E2 arising in the second pixel is calculated by subtracting the resulting value of the second pixel (that is, the tone value expressed by creation of a dot or creation of no dot in the second pixel) from the correction data Cx2 of the second pixel.

The CPU 102 then diffuses the tone error E2 arising in the second pixel to the intermediate buffer at step S226. This corresponds to the series of processing discussed above with reference to FIG. 7(*b*). The error diffusion process multiplies the tone error E2 arising in the second pixel by the error diffusion coefficients set in the specified error diffusion matrix to calculate diffused errors or error divisions to be diffused to peripheral pixels, and stores the calculated error divisions or diffused errors into corresponding modules of the intermediate buffer. When the error division diffused from the first pixel has already been stored in the corresponding module of the intermediate buffer, the newly diffused error division is added to the existing error division. In the example of FIG. 7(*b*), there are existing error divisions in the registers RIO and R11. The newly diffused error division is thus added to the existing error division in these registers R10 and R11. The error divisions to be diffused from the first pixel and the second pixel to the peripheral pixels are thus accumulated in the five registers. At subsequent step S228, the CPU 102 writes the error divisions, which are accumulated in the modules of the intermediate buffer assigned to the respective pixels, into the corresponding error buffer modules on the RAM 106 (see FIG. 7(c)), and resets the intermediate buffer to prepare for the processing with regard to a next set of pixels.

The CPU 102 determines whether or not the processing has already been concluded for all the pixels at step S230. When there are any non-processed pixels, the program returns to step S200 and repeats the series of processing discussed above. Until the determination of the dot on-off state has been completed for all the pixels, the procedure continues determining the dot on-off state for every two pixels, while diffusing the arising tone errors into peripheral pixels. When the processing has been concluded for all the pixels, the program exits from the tone number conversion routine of the first embodiment shown in FIG. 8 and returns to the image data conversion process of FIG. 4.

The tone number conversion process of the first embodiment discussed above diffuses error divisions into error buffer modules assigned to five pixels every time the dot on-off state is determined for two pixels. The general error diffusion method diffuses error divisions into error buffer modules assigned to four pixels every time the dot on-off state is determined for one pixel. The tone number conversion process of the first embodiment thus significantly shortens the processing time required for diffusion of error divisions into corresponding error buffer modules. The tone number conversion process determines the dot on-off state with regard to a large number of pixels constituting an image, while diffusing a tone error arising in each processed pixel to peripheral non-processed pixels. The processing time required for error diffusion into the error buffer accordingly occupies a relatively large portion of the total processing time required for the tone number conversion process. The tone number conversion process of the first embodiment effectively shortens the total processing time and enhances the speed of image processing including the tone number conversion process, thus ensuring high-speed printing of images.

Figure 9A:
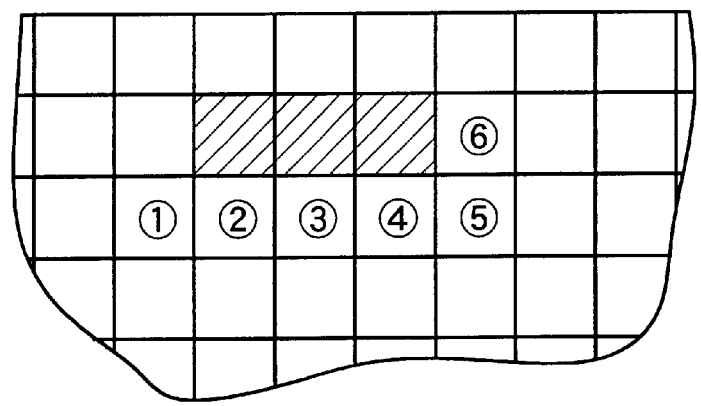
FIG. 9 shows simultaneous diffusion of tone errors arising in greater numbers of pixels in the tone number conversion process of the first embodiment.
Figure 9B:
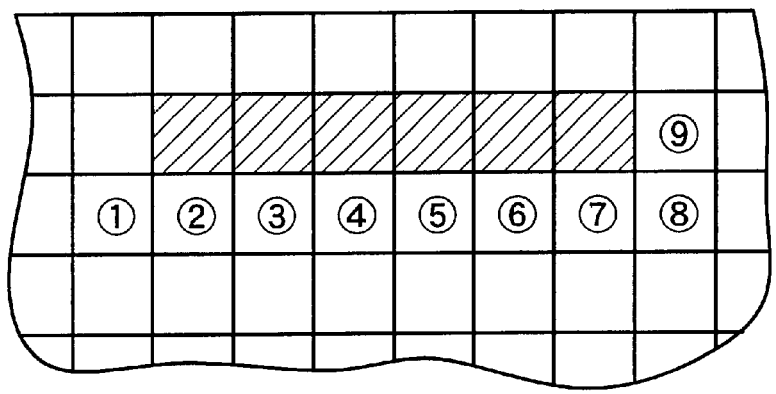

In the above discussion, for convenience of explanation, the dot on-off state is determined for every two pixels. The procedure accumulates the divisions of tone errors arising in two pixels in the intermediate buffer, sums up the error divisions diffused from the two pixels on the intermediate buffer, and diffuses the sum to the error buffer. One possible modification may carry out simultaneous determination of the dot on-off state for a greater number of pixels sum up the divisions of tone errors arising in the greater number of pixels on the intermediate buffer. For example, in the case of determination of the dot on-off state for every three pixels, as shown in FIG. 9(a), divisions of the arising tone errors are diffused to error buffer modules assigned to peripheral six pixels that are in the vicinity of pixels of interest (hatched pixels), which are the object of the determination of the dot on-off state. In this case, error divisions are diffused to error buffer modules assigned to 2 pixels relative to 1 pixel of interest, which is the object of the determination. In the case of determination of the dot on-off state for every six pixels, as shown in FIG. 9(b), divisions of the arising tone errors are diffused to error buffer modules assigned to peripheral nine pixels. In this case error divisions are diffused to error buffer modules assigned to 1.5 pixels, relative to 1 pixel of interest. The greater number of pixels set as the object of simultaneous determination of the dot on-off state decreases the number of pixels allocated to error buffer modules for error diffusion relative to 1 pixel of interest, thus further shortening the processing time required for the tone number conversion process.

B-4. Modification

The tone number conversion process of the first embodiment discussed above calculates the diffused errors or error divisions of the respective tone errors diffused from the first and the second pixels into peripheral pixels, and accumulates the calculated error divisions in each peripheral pixel. One possible modification may register tone errors arising in the first pixel and the second pixel in the intermediate buffer, calculate diffused errors or error divisions to be diffused into peripheral pixels from the registered tone errors, and store the calculated error divisions into error buffer modules assigned to the respective peripheral pixels. There is a difference in values stored in the intermediate buffer, that is, the accumulated error divisions or the tone errors. They are, however, practically equivalent processes, since the same error divisions are written into the error buffer. The following describes such a modified example of the first embodiment.

Figure 10:
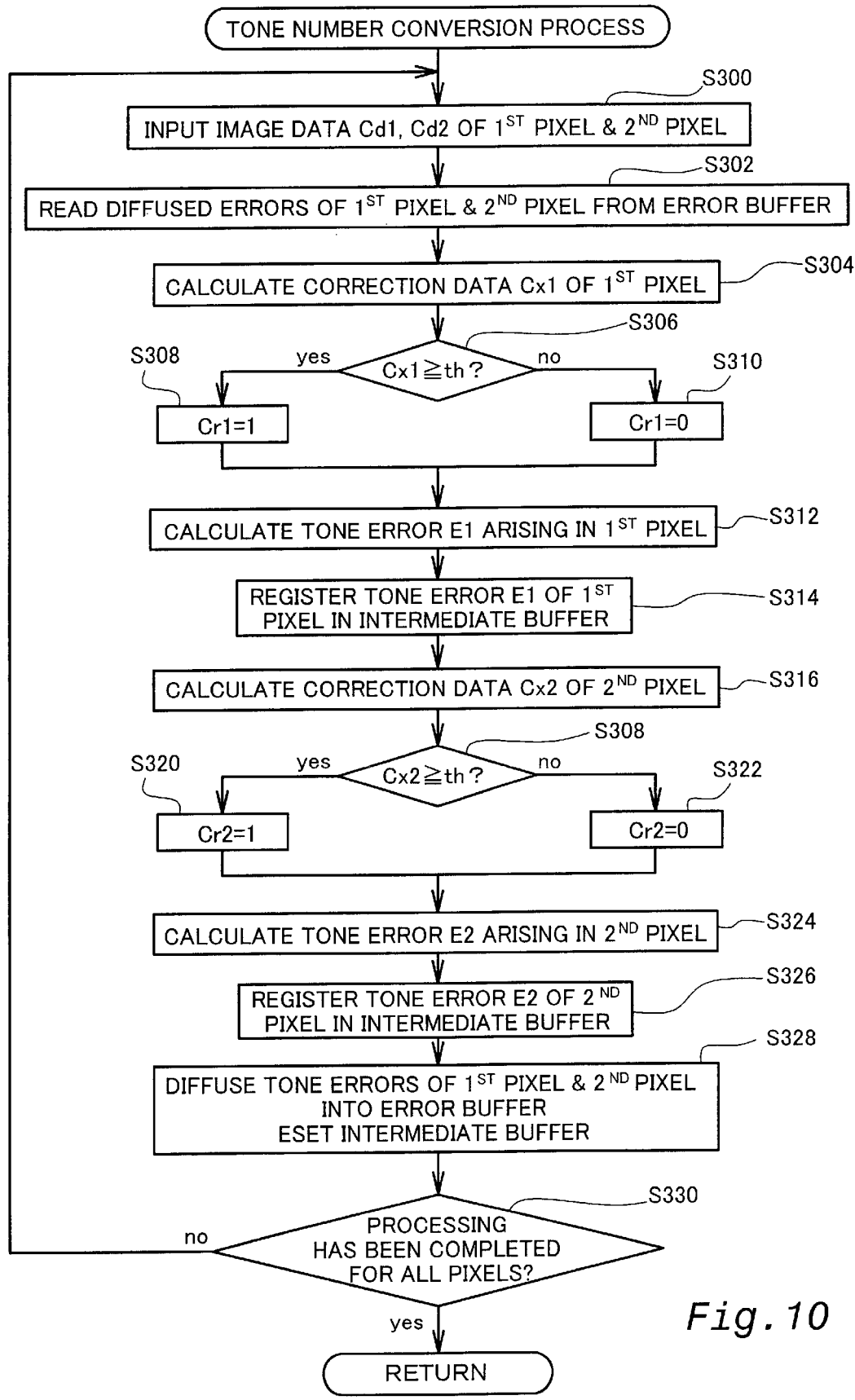
FIG. 10 is a flowchart showing a modified tone number conversion process executed in a modified example of the first embodiment.

FIG. 10 is a flowchart showing a modified tone number conversion routine executed in a modified example of the first embodiment. The following description, with reference to FIG. 10, regards the tone number conversion process of the modified example, especially the differences from the tone number conversion process of the first embodiment shown in FIG. 8.

In the same manner as the tone number conversion routine of the first embodiment, when entering the modified tone number conversion routine, the CPU 102 reads image data Cd1 and Cd2 of a first pixel and a second pixel at step S300. Here the first pixel represents a left pixel between two pixels of interest, which are the object of determination of the dot on-off state. The second pixel represents a right pixel. The CPU 102 then reads diffused errors Ed1 and Ed2, which are diffused respectively to the first pixel and the second pixel, from the corresponding error buffer modules at step S302. The error buffer is provided on the RAM 106 in the same manner as the first embodiment. The CPU 102 sums up the image data Cd1 of the first pixel and the diffused error Ed1 of the first pixel to calculate correction data Cx1 of the first pixel at step S304, and compares the calculated correction data Cx1 of the first pixel with a preset threshold value th at step S306. When the correction data Cx1 is not smaller than the preset threshold value th, the CPU 102 determines creation of a dot in the first pixel and writes the value '1' representing the dot on state into a variable Cr1 showing the result of determination with regard to the first pixel at step S308. Otherwise the CPU 102 determines creation of no dot in the first pixel and writes the value '0' representing the dot off state into the variable Cr1 at step S310. After the determination of the dot on-off state with regard to the first pixel, the CPU 102 calculates a tone error E1 arising in the first pixel due to the determination at step S312. As discussed in the first embodiment, the tone error E1 is calculated by subtracting the resulting value from the correction data Cx1.

In the modified example of the first embodiment, the calculated tone error E1 arising in the first pixel is registered in the intermediate buffer at step S314. Whereas the tone number conversion process of the first embodiment diffuses the tone error into the intermediate buffer, the tone number conversion process of the modified example stores the tone error in the intermediate buffer without diffusion.

After registering the calculated tone error E1 of the first pixel in the intermediate buffer, the CPU 102 calculates correction data Cx2 of the second pixel, in order to determine the dot on-off state in the second pixel at step S316. The process sums up the image data Cd2 of the second pixel, the diffused error Ed2 of the second pixel, and the error division diffused from the first pixel. The error division diffused from the first pixel is obtained by multiplying the tone error E1 of the first pixel registered in the intermediate buffer by a preset error diffusion coefficient. As discussed in the first embodiment, the value of the preset error diffusion coefficient is set in the error diffusion matrix. The calculated correction data Cx2 of the second pixel is compared with the preset threshold value th at step S318. When the correction data Cx2 is not smaller than the preset threshold value th, the CPU 102 determines creation of a dot and writes the value '1' representing the dot on state in a variable Cr2 showing the result of determination of the dot on-off state with regard to the second pixel at step S320. Otherwise the CPU 102 determines creation of no dot and writes the value '0' representing the dot off state in the variable Cr2 at step S322. The CPU 102 subsequently calculates a tone error E2 arising in the second pixel due to the determination at step S324, and temporarily registers the calculated tone error E2 in the intermediate buffer without diffusion into peripheral pixels at step S326. The tone error E2 of the second pixel should be stored separately from the tone error E1 of the first pixel registered in advance. Like the tone error E1 of the first pixel, the tone error E2 of the second pixel is calculated by subtracting the resulting value from the correction data Cx2 of the second pixel.

After the registration of the tone errors E1 and E2 of the first and second pixels in the intermediate buffer, the two tone errors are collectively diffused into the error buffer at step S328. This process is described with reference to FIG. 7. In the drawing of FIG. 7, the pixel P00 and the pixel P01 respectively correspond to the first pixel and the second pixel. As mentioned previously, the tone errors arising in the first pixel and the second pixel are diffused to the peripheral five pixels in the vicinity of the first and second pixels with preset factors. For example, an error division K1-1×E00 is diffused from the first pixel P00 to the pixel P1-1 off to the lower left of the first pixel P00. Here K1-1 represents an error diffusion coefficient used for diffusion of the tone error to the lower left pixel, and the value of the error diffusion coefficient is set in the error diffusion matrix. The sum of error divisions (K10×E00+K1-1×E01), that is, the summation of an error division K10×E00 from the first pixel P00 and an error division K1-1×E01 from the second pixel P01, is diffused to the pixel P10. Similarly, the sum of error divisions (K11×E00+K10×E01), an error division K11×E01, and an error division K01×E01 are respectively diffused to the pixels P11, P12, and P02. The error divisions diffused to the peripheral pixels are calculated from the tone errors E1 and E2 and the error diffusion coefficients. The process of step S328 calculates the error divisions to be diffused to the peripheral pixels in the vicinity of the first and second pixels from the tone error E1 of the first pixel and the tone error E2 of the second pixel registered in the intermediate buffer, and accumulates the calculated error divisions in the error buffer modules assigned to the respective peripheral pixels. On completion of this processing, the intermediate buffer is reset to prepare for registration of tone errors arising in a next set of pixels.

The CPU 102 determines whether or not the processing has already been concluded for all the pixels at step S330. When there are any non-processed pixels, the program returns to step S300 and repeats the series of processing discussed above. When the processing has been concluded for all the pixels, the program exits from the tone number conversion routine as the modification of the first embodiment shown in FIG. 10 and returns to the image data conversion process of FIG. 4.

The modified tone number conversion process discussed above attains the practically equivalent effects to the tone number conversion process of the first embodiment. Compared with the method of the first embodiment, the method of the modified example desirably saves the capacity of the intermediate buffer.

C. Second Embodiment

C-1. Principles of Shortening Time Required for Tone Number Conversion Process in Second Embodiment The tone number conversion process of the first embodiment discussed above diffuses the tone error, which arises due to determination of the dot on-off state, into the intermediate buffer like registers that allow high-speed reading and writing operations. The process writes all the error divisions, which are diffused in the intermediate buffer, into the error buffer every time determination of the dot on-off state is concluded for a preset number of pixels. Another tone number conversion process executed in a second embodiment discussed below, on the other hand, writes the error divisions with regard to one pixel into the error buffer every time determination of the dot on-off state is concluded for one pixel. As discussed below, the method of the second embodiment requires a less number of registers to implement the tone number conversion process, compared with the method of the first embodiment. The procedure of the second embodiment also decreases the writing frequency from the intermediate buffer like registers into the error buffer. This procedure is discussed below as the second embodiment.

Figure 11A:
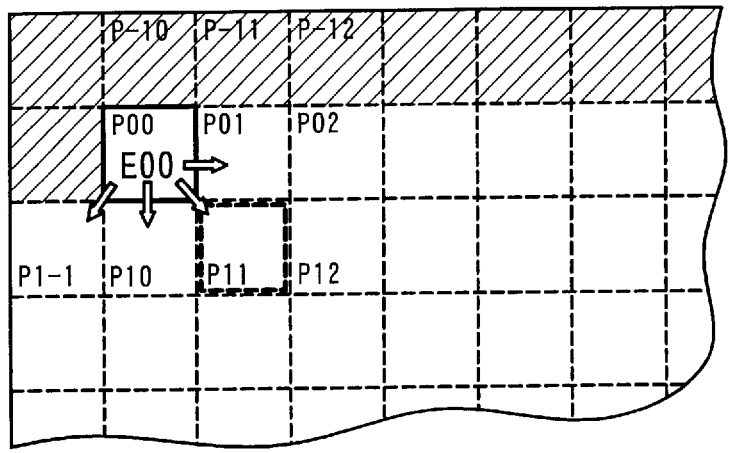
FIG. 11 shows the principles of shortening the processing time in a tone number conversion process of a second embodiment.
Figure 11B:
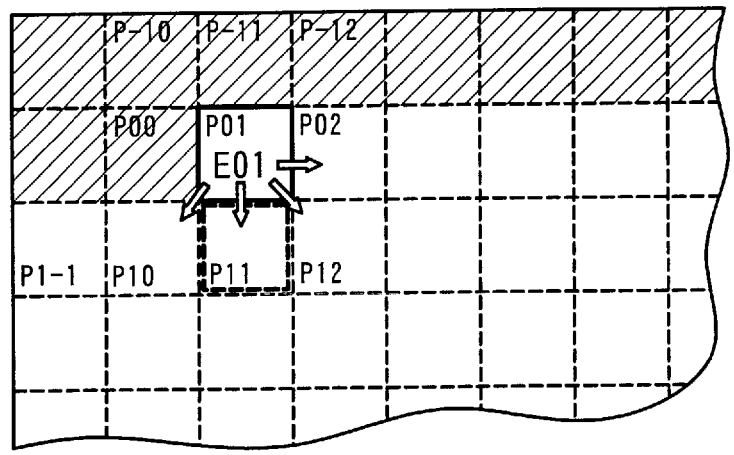
Figure 11C:
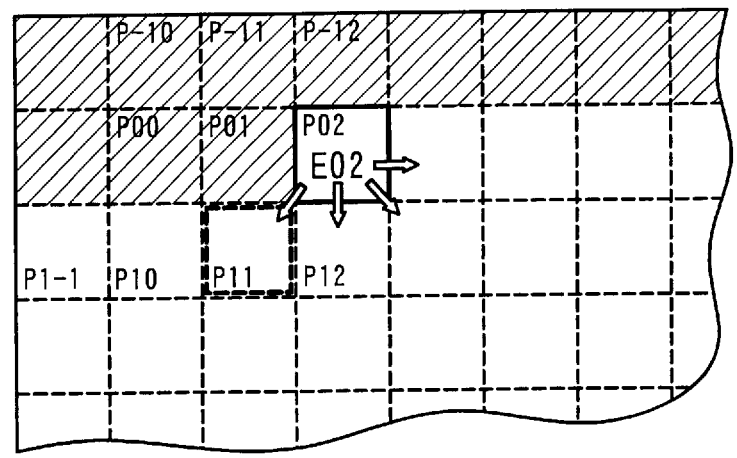

The principles of the processing of the second embodiment are discussed first with referring to FIG. 11. The method of the second embodiment writes the diffused errors or error divisions with regard to one pixel into the error buffer every time determination of the dot on-off state is concluded for one pixel, thus attaining the practically equivalent effects to those of the general error diffusion method. In the drawing of FIG. 11, hatched portions represent areas of processed pixels that have already undergone determination of the dot on-off state. For convenience of explanation, in the same manner as the first embodiment, the matrix of FIG. 6(a) is applied for the error diffusion matrix. FIG. 11(a) shows a process of diffusing a tone error E00 arising in a pixel P00 into peripheral pixels due to determination of the dot on-off state in the pixel P00.

Here a pixel P11 defined by thick broken lines is noted. Error divisions of a tone error E01 arising in a pixel P01 right adjoining to the pixel P00 and a tone error E02 arising in a pixel P02 right adjoining to the pixel P01 as well as the tone error E00 arising in the pixel P00 are diffused to the pixel P11 (see FIGS. 11(b) and 11(c)). Namely error divisions are successively distributed from three consecutive pixels to one pixel. Using the error diffusion matrix shown in FIG. 6(a) or FIG. 6(e) results in successive diffusion of error divisions from three consecutive pixels. Using another error diffusion matrix shown in FIG. 6(b) or FIG. 6(f) results in successive diffusion of error divisions from five consecutive pixels. Using still another error diffusion matrix shown in FIG. 6(c) results in successive diffusion of error divisions from seven consecutive pixels. The procedure of the second embodiment accumulates the error divisions successively distributed from the consecutive pixels to a certain pixel in an error memory of the intermediate buffer assigned to the certain pixel. When the error divisions from a preset number of pixels have been accumulated in the specific module of the intermediate buffer assigned to the certain pixel, it is assumed that error diffusion is completed for the certain pixel. The procedure then writes the sum of error divisions, which have been accumulated in the intermediate buffer, into the error buffer. This procedure writes the sum of error divisions, which have been accumulated in the specific module of the intermediate buffer assigned to the certain pixel, into the corresponding error buffer module, based on the assumption. This arrangement does not require frequent operations of writing error divisions into the error buffer module assigned to the certain pixel, thus desirably reducing the frequency of reading and writing operations from and into the error buffer.

Figure 12A:
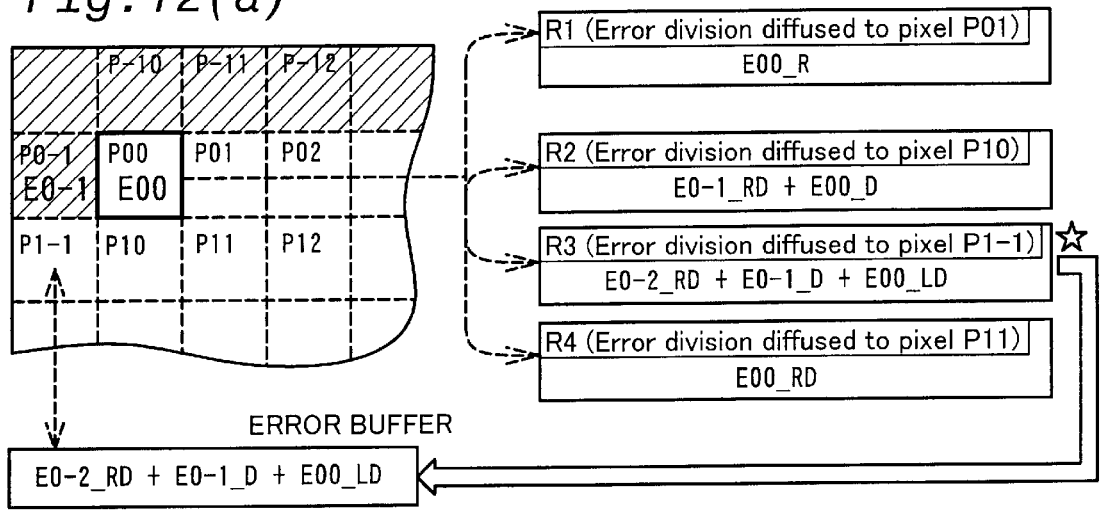
FIG. 12 shows the outline of data transmission between the intermediate buffer and the error buffer in the tone number conversion process of the second embodiment.

FIG. 12 conceptually shows a process of utilizing the intermediate buffer to actualize the principles discussed above. FIG. 12(a) shows the state in which determination of the dot on-off state in the pixel P00 is concluded. Four rectangles shown on the right side of FIG. 12(a) schematically represent four registers used for the intermediate buffer. For convenience of explanation, the respective registers are distinguished from one another by symbols R1, R2, R3, and R4. A tone error E00 arising in the pixel of interest P00 is multiplied by the error diffusion coefficients set in the error diffusion matrix and diffused to the respective registers. For simplicity of illustration, in the drawing of FIG. 12, the error division diffused from the pixel P00 to its lower left pixel is expressed as E00_LD. The value of the error division E00_LD is obtained by multiplying the tone error E00 of the pixel P00 by the error diffusion coefficient K1-1. Similarly the error division diffused from the pixel P00 to its immediate under pixel is expressed as E00_D. The error division diffused from the pixel P00 to its lower right pixel is expressed as E00_RD. The error division diffused from the pixel P00 to its right-side pixel is expressed as E00_R. This system of expression is applied for the tone error arising in another pixel. For example, the error division diffused from the pixel P01 to its lower left pixel is expressed as E01_LD. The error divisions diffused from the pixel P01 to its immediate under pixel, to its lower right pixel, and to its right-side pixel are respectively expressed as E01_D, E01_RD, and E01_R. The asterisk attached to the right side of each register shows that error divisions diffused from a preset number of pixels have been accumulated in the register. The details of the processing expressed by the asterisk will be discussed later.

Referring to FIG. 12(a), discussion regards the process of diffusing the tone error E00 arising in the pixel of interest P00 into the four registers R1 through R4. Among the four registers, the register R1 is overwritten with the error division diffused from the pixel of interest to its right-side pixel. Unlike the three other registers, the register R1 is always overwritten with the error division diffused to the pixel right adjoining to the pixel of interest. In the state of FIG. 12(a), the register RI is overwritten with the value of the error division E00_R diffused from the pixel of interest P00 to its right-side pixel P01. The error divisions diffused from the pixel of interest P00 to its lower left pixel, to its immediate under pixel, and to its lower right pixel are added to the other three registers. Which error division is added to which register is sequentially varied with the shift in pixel of interest.

When the pixel P00 is the pixel of interest (in the state of FIG. 12(a)), the error division diffused from the pixel P00 to the pixel P10 (that is, the error division diffused from the pixel of interest to its immediate under pixel) is added to the register R2. The error division diffused from the pixel P00 to the pixel P1-1 (that is, the error division diffused from the pixel of interest to its lower left pixel) is added to the register R3. The error division diffused from the pixel P00 to the pixel P11 (that is, the error division diffused from the pixel of interest to its lower right pixel) is added to the register R4.

Figure 12B:
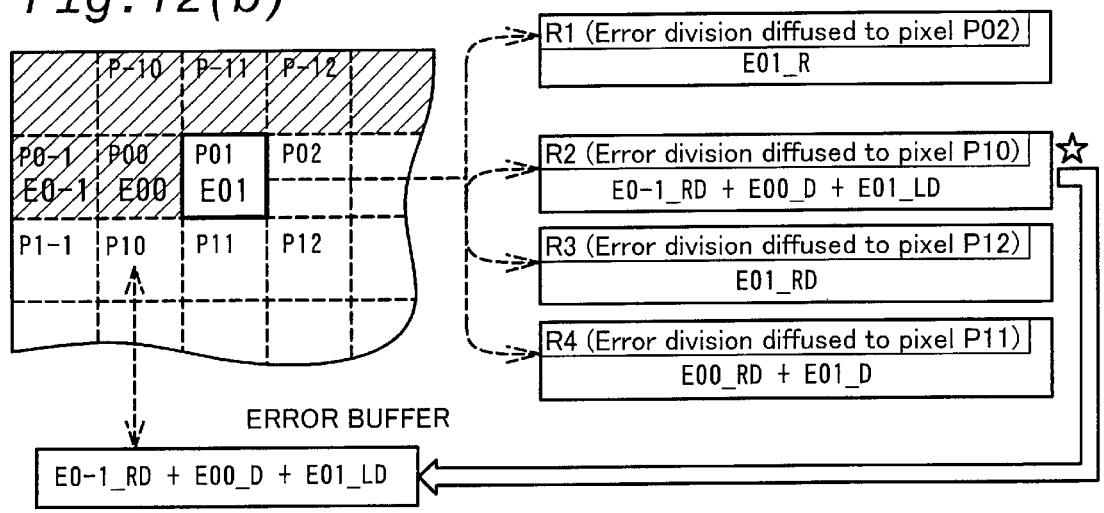

The pixel of interest is shifted to the pixel P01 (in the state of FIG. 12(b)). Even when the pixel of interest is shifted to the pixel P01, the error division diffused to the pixel P10 is still added to the register R2. After the shift in pixel of interest, the pixel P10 is located off to the lower left of the new pixel of interest P01. The error division diffused from the pixel of interest to its lower left pixel is added to the register R2. Namely the error division diffused from the pixel of interest to its immediate under pixel is added to the register R2 when the pixel of interest is the pixel P00, whereas the error division diffused from the pixel of interest to its lower left pixel is added to the register R2 after the shift in pixel of interest to the pixel P01.

In a similar manner, the error division diffused to the pixel P11 is added to the register R4. Namely the error division diffused from the pixel of interest to its lower right pixel is added to the register R4 when the pixel of interest is the pixel P00, whereas the error division diffused from the pixel of interest to its immediate under pixel is added to the register R4 after the shift in pixel of interest to the pixel P01.

When the pixel of interest is the pixel P00, the error division diffused from the pixel of interest P00 to its lower left pixel P1-1 is added to the register R3. After the shift in pixel of interest to the pixel P01, error diffusion to the pixel P1-1 is not required. The error division diffused from the new pixel of interest P01 to the pixel P12 is accordingly added to the register R3. Like the other registers, with the shift in pixel of interest, the error division diffused from the pixel of interest to a pixel located in another direction is added to the register R3. Namely the error division diffused from the pixel of interest to its lower left pixel is added to the register R3 when the pixel of interest is the pixel P00, whereas the error division diffused from the pixel of interest to its lower right pixel is added to the register R3 after the shift in pixel of interest to the pixel P01.

Figure 12C:
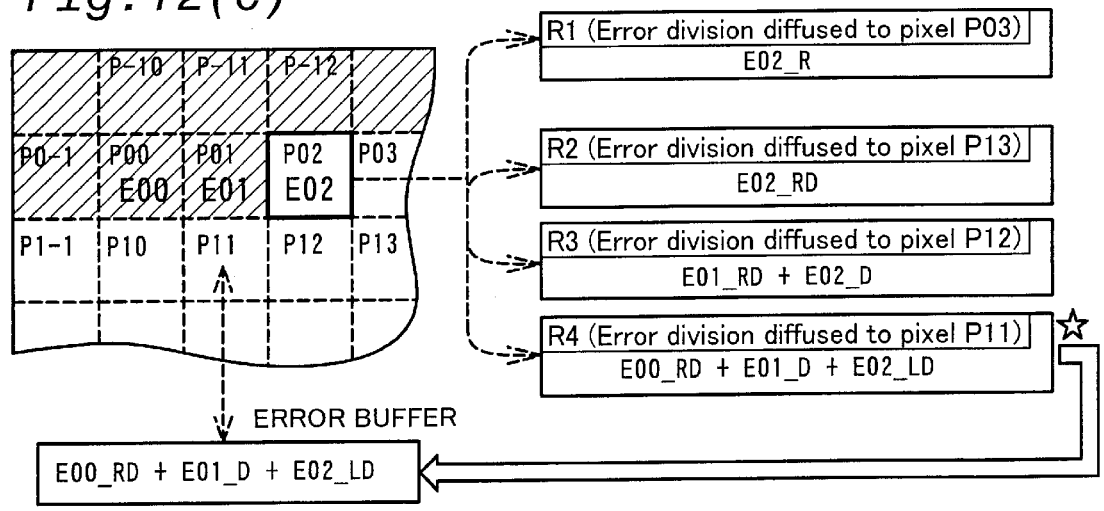

When the pixel of interest is further shifted from the pixel P01 to the pixel P02, the error divisions diffused from the pixel of interest to pixels located in other directions are added to the three registers R2 through R4. FIG. 12(c) shows the state in which error divisions are diffused from the new pixel of interest P02 to the respective registers. As clearly understood from the comparison between FIG. 12(b) and FIG. 12(c), when the pixel of interest is the pixel P01, the error divisions diffused from the pixel of interest to its lower left pixel, to its lower right pixel, and to its immediate under pixel are respectively added to the registers R2, R3, and R4. With the shift in pixel of interest from the pixel P01 to the pixel P02, the error divisions diffused from the pixel of interest to its lower right pixel, to its immediate under pixel, and to its lower left pixel are added to the respective registers R2, R3, and R4.

In the tone number conversion process of the second embodiment, the error divisions diffused from the pixel of interest to its lower right pixel, to its immediate under pixel, and to its lower left pixel are added to the three registers R2 through R4. Which error division is added to which register is sequentially varied with the shift in pixel of interest. The procedure sequentially accumulates the error divisions with the shift in pixel of interest, while resetting the respective registers at adequate timings. This causes the error divisions diffused from three consecutive pixels of interest to be successively accumulated in each register. This process is discussed more concretely with the register R4 as an example.

When the pixel of interest is the pixel P00, the error division E00_RD diffused from the pixel of interest P00 to its lower right pixel is added to the register R4 as shown in FIG. 12(a). As discussed later, at the time of addition of the error divisions E00_RD, the register R4 has been reset to have no existing error division stored therein. When the pixel of interest is shifted to the pixel P01, the error division E01_D diffused from the new pixel of interest P01 to its immediate under pixel is added to the register R4 as shown in FIG. 12(b). At this moment, the register R4 has the existing error division E00_RD diffused from the previous pixel of interest P00. The error division E01_D diffused from the new pixel of interest P01 is accordingly added to the existing error division E00_RD. When the pixel of interest is further shifted to the pixel P02, the error division E02_LD diffused from the new pixel of interest P02 to its lower left pixel is added to the register R4 as shown in FIG. 12(c). At this moment, the register R4 has the existing error divisions E00_RD and E01_D diffused from the previous pixels of interest P00 and P01. The error division E02_LD diffused from the new pixel of interest P02 is accordingly added to the existing error divisions E00_RD and E01_D. This series of processing causes the error divisions diffused from the three consecutive pixels of interest, P00, P01, and P02 to be accumulated in the register R4. The asterisk added to the right side of the register R4 in FIG. 12(c) shows that the error division diffused from the last pixel of interest among the three consecutive pixels of interest is added to the register R4. On completion of accumulation of the error divisions diffused from the three consecutive pixels of interest in the register R4, the accumulated value is written into the error buffer.

As clearly understood from the above explanation, the error divisions diffused to the pixel P11 are accumulated in the register R4. The accumulated value in the register R4 is thus written into an error memory of the error buffer assigned to the pixel P11. The open arrow going from the register R4 to the error buffer in FIG. 12(c) schematically shows the process of writing the sum of the error divisions, which are accumulated in the register R4, into the error buffer. The broken arrow connecting the error buffer module with the pixel P11 schematically shows that the error buffer module is mapped to the pixel P11. After writing the accumulated value into the error buffer, the procedure resets the register R4. As mentioned above with reference to FIG. 12(a), at the time when the error division diffused from the pixel of interest P00 is added to the register R4, the register R4 has already been reset to have no accumulation therein. This is because addition of the error division diffused from the previous pixel of interest P0-1 completes the accumulation of the error divisions diffused from the three consecutive pixels of interest in the register R4 and causes the register R4 to be reset.

The following description notes the register R3. As shown in FIG. 12(a), on completion of addition of the error division from the current pixel of interest P00, the register R3 has the accumulated error divisions diffused from the three consecutive pixels of interest P0-2, P0-1, and P00. The asterisk attached to the right side of the register R3 shows that addition of the error division diffused from the current pixel of interest P00 completes the accumulation of the error divisions diffused from the three consecutive pixels of interest. After the addition of the error division diffused from the current pixel of interest P00, the accumulated value in the register R3 is written into the error buffer. Since the error divisions diffused to the pixel P1-1 are accumulated in the register R3, the accumulated value in the register R3 is written into an error memory of the error buffer assigned to the pixel P1-1. After writing the accumulated value into the error buffer, the procedure resets the register R3.

The timing of resetting the register R3 is compared with the timing of resetting the register R4. The register R4 is reset before addition of the error division diffused from the pixel of interest P00, that is, after addition of the error division diffused from the pixel of interest P0-1. The register R3 is reset, on the other hand, after addition of the error division diffused from the pixel of interest P00. Namely the timing of resetting the register R3 is behind the timing of resetting the register R4 by one pixel of interest.

As shown in FIG. 12(b), when the pixel of interest is shifted from the pixel P00 to the pixel P01, the new pixel P12, in place of the pixel P1-1, is allocated to the register R3. The pixel P12 is located off to the lower right of the new pixel of interest P01. The error division E01_RD diffused from the pixel of interest to its lower right pixel is accordingly added to the register R3. The register R3 has already been reset to have no existing error division therein, at the time of addition of the error division diffused from the pixel of interest P01. When the pixel of interest is further shifted to the pixel P02, as shown in FIG. 12(c), the error division E02_D diffused from the pixel of interest to its immediate under pixel is added to the existing error division E01_RD in the register R3. When the pixel of interest is still further shifted to the pixel P03, addition of the error division E03_LD diffused from the new pixel of interest P03 completes accumulation of the error divisions diffused from the three consecutive pixels of interest P01, P02, and P03 in the register R3. The accumulated value in the register R3 is then written into the error buffer. The sum of the error divisions accumulated in the register R4 is written into the error buffer after addition of the error division diffused from the pixel of interest P02. The sum of the error divisions accumulated in the register R3 is, on the other hand, written into the error buffer after addition of the error division diffused from the pixel of interest P03. Namely the processing of the register R3 is behind the processing of the register R4 by one pixel of interest.

The timing of resetting the register R2 is behind the timing of resetting the register R3 by one pixel of interest. As shown in FIG. 12(a), the sum of the error divisions accumulated in the register R3 is written into the error buffer and the register R3 is reset after addition of the error division diffused from the pixel of interest P00. The sum of the error divisions accumulated in the register R2 is written into the error buffer and the register R2 is reset, on the other hand, after addition of the error division diffused from the pixel of interest P01.

In the above manner, with each shift in pixel of interest, the error divisions diffused from the three consecutive pixels of interest are successively accumulated in each of the three registers R2 through R4 and sequentially written into the error buffer.

As discussed above, the register R1 stores the error division used for determination of the dot on-off state in a next pixel of interest, whereas the other three registers R2 through R4 successively accumulate the diffused error divisions of the tone errors. This arrangement enables the accumulated value with regard to one pixel, for which the error divisions diffused from three consecutive pixels have been accumulated, to be written into the error buffer every time determination of the dot on-off state is concluded for one pixel.

C-2. Tone Number Conversion Process in Second Embodiment

Figure 13:
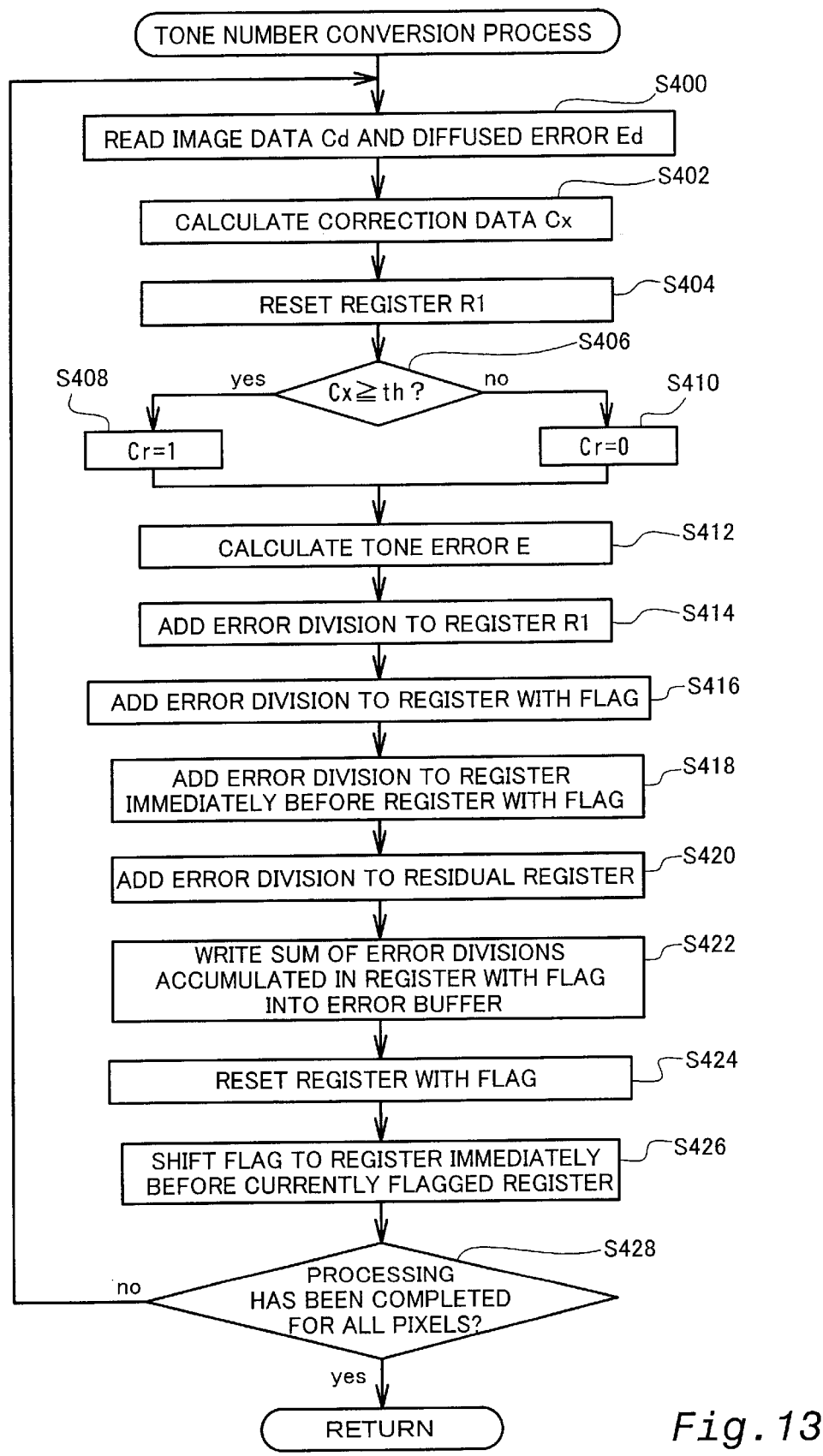
FIG. 13 is a flowchart showing the general flow of the tone number conversion process executed in the second embodiment.

FIG. 13 is a flowchart showing the tone number conversion process of the second embodiment discussed above. Like the tone number conversion process of the first embodiment, the CPU 102 in the computer 100 executes the tone number conversion process of the second embodiment. Although the description below does not specify the ink color or the dot size for the clarity of explanation, the same series of processing is carried out for each ink color or for each dot size. The following description, with reference to the flowchart of FIG. 13, regards the tone number conversion process of the second embodiment, especially the differences from the tone number conversion process of the first embodiment.

When entering the tone number conversion routine of the second embodiment, the CPU 102 first reads image data Cd and a diffused error Ed with regard to a pixel of interest from the RAM 106 at step S400, and sums up the input image data Cd, the input diffused error Ed, and the error division accumulated in the register R1, so as to calculate correction data Cx with regard to the pixel of interest at step S402. On completion of the calculation of the correction data Cx, the register R1 is reset at step S404. The calculated correction data Cx is compared with a preset threshold value th at step S406. When the correction data Cx is not smaller than the preset threshold value th, the CPU 102 determines creation of a dot in the pixel of interest and writes the value '1' representing the dot on state into a variable Cr showing the result of determination at step S408. Otherwise the CPU 102 determines creation of no dot in the pixel of interest and writes the value '0' representing the dot off state into the variable Cr at step S410.

After the determination of the dot on-off state with regard to the pixel of interest, the CPU 102 calculates a tone error E arising in the pixel of interest due to the determination at step S412. The tone error E arising in the pixel of interest is calculated by subtracting the resulting value in the pixel of interest (the tone value expressed by creation of a dot or creation of no dot in the pixel of interest) from the correction data Cx with regard to the pixel of interest.

The procedure multiplies the tone error E calculated at step S412 by predetermined error diffusion coefficients mapped to the respective pixel positions in the error diffusion matrix, and adds the error divisions calculated for the respective pixel positions to the corresponding registers. The error division diffused from the pixel of interest to its right-side pixel is added to the register R1 at step S414. The error divisions are then sequentially added to the other three registers R2 through R4. A flag is set in advance in a specific register among the three registers R2 through R4, to which the error division diffused from a last pixel out of three consecutive pixels of interest is added, that is, in the register with the asterisk in FIG. 12. The error division diffused from the pixel of interest to its lower left pixel is added to the register with the flag at step S416. As shown in the error diffusion matrix of FIG. 6(a), the value obtained by multiplying the tone error E by the error diffusion coefficient K1-1 is distributed from the pixel of interest to its lower left pixel. At subsequent step S418, the error division diffused from the pixel of interest to its immediate under pixel is added to the register immediately before the register with the flag, among the three registers in which the error divisions are accumulated. The error division distributed from the pixel of interest to its immediate under pixel is obtained by multiplying the tone error E by the error diffusion coefficient K10. Here the register immediately before the register with the flag represents the register R2 when the register with the asterisk is the register R3 as shown in FIG. 12(a), while representing the register R4 when the register with the asterisk is the register R2 as shown in FIG. 12(b). The error division diffused from the pixel of interest to its lower right pixel, that is, the value obtained by multiplying the tone error E by the error diffusion coefficient K11, is added to the residual resister among the three registers at step S420.

On completion of addition of the error divisions, which are obtained by multiplying the tone error by the predetermined error diffusion coefficients, to the corresponding registers, the sum of the error divisions accumulated in the register with the flag is written into the error buffer module assigned to the pixel that is off to the lower left of the pixel of interest at step S422. For example, when the pixel of interest is the pixel P02 as shown in FIG. 12(c), the sum of the accumulated error divisions is written into the error buffer module assigned to the pixel P11. The register R4 with the flag has the accumulated error divisions respectively diffused from the pixels P00, P01, and P02. The tone number conversion process of the second embodiment thus gives the practically equivalent results to those of the general error diffusion method shown in FIG. 5. After writing the sum of the accumulated error divisions into the error buffer, the register with the flag is reset to prepare for accumulation of newly diffused error divisions at step S424.

When the above series of processing is concluded with regard to one pixel of interest, the flag is shifted to the register immediately before the register currently having the flag at step S426. The CPU 102 determines whether or not the processing has been completed for all the pixels at step S428. When there are any non-processed pixels, the program returns to step S400 and repeats the series of processing discussed above. When the processing has been concluded for all the pixels, the program exits from the tone number conversion routine of the second embodiment shown in FIG. 13 and returns to the image data conversion process of FIG. 4.

The processing of step S414 may overwrite the register R1, instead of adding the calculated error division to the register R1. Such modification desirably omits the process of resetting the register R1 at step S404. Similar modification to change the process of adding the error division to the residual register to the process of overwriting the residual register desirably omits the process of resetting the register with the flag at step S424.

The tone number conversion process of the second embodiment discussed above writes the sum of error divisions with regard to one pixel into the error buffer every time determination of the dot on-off state is concluded for one pixel. This arrangement significantly shortens the processing time required for error diffusion into the error buffer. In the case where the general error diffusion method is applied for the tone number conversion, the processing time required for error diffusion occupies a relatively large portion of the total processing time required for the tone number conversion. The tone number conversion process of the second embodiment thus effectively shortens the total processing time and thereby ensures high-speed printing of images.

The tone number conversion process of the first embodiment described previously shortens the processing time required for error diffusion. The tone number conversion process of the second embodiment further efficiently shortens the processing time required for error diffusion. The method of the first embodiment writes the error divisions into the error buffer with the frequency of 2.5 pixels per determination of the dot on-off state for one pixel. The method of the second embodiment reduces the writing frequency to 1 pixel per determination of the dot on-off state for one pixel. The first embodiment shown in FIG. 7 uses the six registers for the intermediate buffer, whereas the second embodiment uses only the four registers for the intermediate buffer as shown in FIG. 12. The arrangement of the second embodiment thus allows the marginal registers of the CPU 102 to be used for the other purposes.

C-3. Modification

The tone number conversion process of the second embodiment described above accumulates the error divisions of the tone errors arising in pixels of interest in the four registers. The register R1 is used differently from the other three registers R2 through R4. The register R1 is always overwritten with the error division distributed from the pixel of interest to its right-side pixel. As for the other three registers, however, the mapped pixel position of each register relative to the pixel of interest is not fixed but is varied with the shift in pixel of interest.

Figure 14:
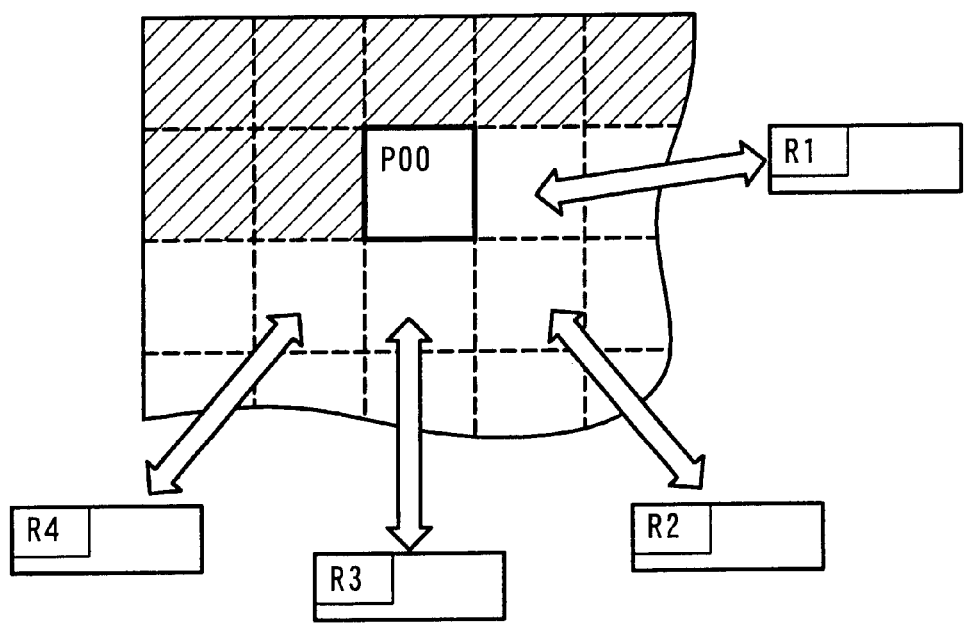
FIG. 14 shows the mapping of each peripheral pixel in the vicinity of a pixel of interest to each register when the mapped pixel position of each register is fixed to the pixel of interest.

As shown in FIG. 14, the pixel positions mapped to the respective registers may alternatively be fixed relative to the pixel of interest. For example, while the register R1 is always overwritten with the error division diffused from the pixel of interest to its right-side pixel, the error divisions diffused from the pixel of interest to its lower right pixel, to its immediate under pixel, and to its lower left pixel are always added to the registers R2, R3, and R4, respectively. While the mapping of the pixel position relative to the pixel of interest to the register is fixed, the error divisions accumulated in each register are sequentially shifted to a next register with the shift in pixel of interest, as discussed below. In this arrangement, the error divisions accumulated in an identical register are written into the error buffer. This desirably simplifies the process of writing the error divisions from the register into the error buffer. This procedure fixes the error diffusion coefficient set in each register to an identical value, thus effectively simplifying the process of calculating the error division of the tone error arising in the pixel of interest, which is to be added to each register.

Figure 15A:
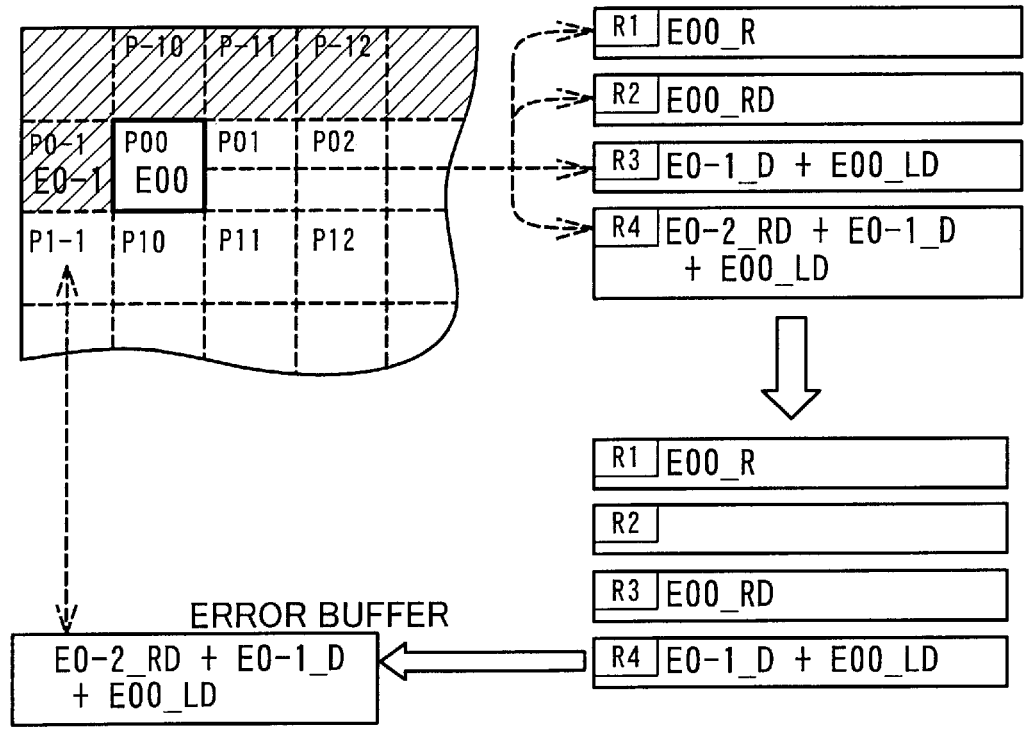
FIG. 15 shows the principles of shortening the processing time in a modified tone number conversion process as a modified example of the second embodiment.

The tone number conversion process based on such modification of the second embodiment is briefly described with reference to FIG. 15. FIG. 15(a) shows the state in which determination of the dot on-off state in the pixel of interest P00 is concluded. Four rectangles on the right side of the drawing schematically represent the respective registers. The register R1 is always overwritten with the error division diffused from the pixel of interest to its right-side pixel. The error divisions diffused from the pixel of interest to its lower right pixel, to its immediate under pixel, and to its lower left pixel are always added to the registers R2, R3, and R4, respectively.

The error division distributed to the pixel having an identical positional relation to the pixel of interest is added to each register, so that the error diffusion coefficient set in each register is fixed to an identical value. As seen from FIG. 6, the error diffusion coefficient set in the register R1 is fixed to the error diffusion coefficient K01 used for error diffusion from the pixel of interest to its right-side pixel. The error diffusion coefficient set in the register R2 is fixed to the error diffusion coefficient K11 used for error diffusion from the pixel of interest to its lower right pixel. The error diffusion coefficient set in the register R3 is fixed to K10, and the error diffusion coefficient set in the register R4 is fixed to K1-1. The arrangement of fixing the error diffusion coefficient set in each register to an identical value facilitates the calculation of the error division added to each register from the tone error arising in the pixel of interest.

After addition of the error divisions of the tone error E00 arising in the pixel of interest P00 to the respective registers, the procedure writes the sum of the error divisions, which are accumulated in the register R4, into the error buffer, and simultaneously shifts the value accumulated in each register to a next register. Namely the value accumulated in the register R3 is shifted to the register R4, whereas the value accumulated in the register R2 is shifted to the register R3 (see the lower half of FIG. 15(a)).

Figure 15B:
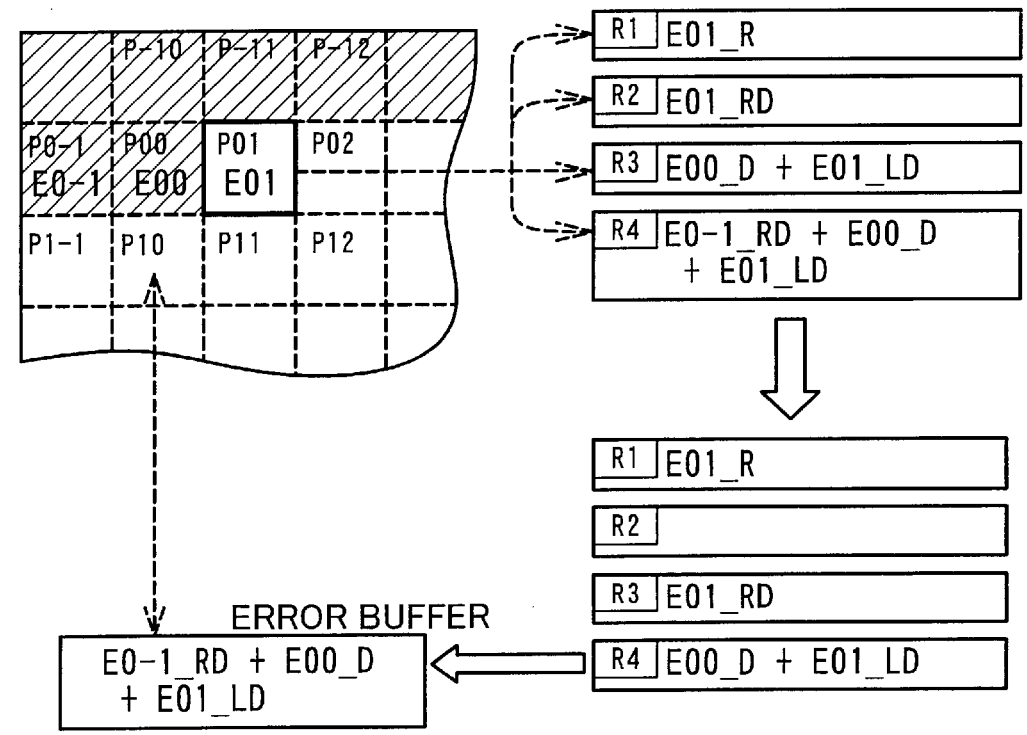

The procedure then shifts the pixel of interest to the pixel P01 and carries out the same series of processing. Namely the procedure multiplies the tone error E01 arising in the new pixel of interest P01 by the predetermined error diffusion coefficients to obtain error divisions, adds the calculated error divisions to the respective registers, and writes the sum of the error divisions accumulated in the register R4 into the error buffer. Since the value accumulated in each register has been shifted in advance to a next register, the error divisions diffused from three pixels are always accumulated in the register R4 on completion of the addition of the error divisions to the respective registers as shown in FIG. 15(b). The modified process of the second embodiment writes the error divisions accumulated in the identical register into the error buffer. This desirably simplifies the process of writing the diffused error divisions from the register to the error buffer. The series of processing shown in FIG. 15 requires the additional process of shifting the error divisions accumulated in each register to a next register. Such a shift of the accumulated value between adjoining registers is, however, implemented very quickly, so that the additional process hardly increases the total processing time.

In the tone number conversion process of the second embodiment and the modified tone number conversion process as the modified example of the second embodiment, for the clarity of explanation, the matrix of FIG. 6(a) having the narrowest diffusion range is applied for the error diffusion matrix. The error diffusion matrix is, however, not restricted to the matrix of FIG. 6(a) but may be any appropriate matrix. As discussed in the first embodiment, the cache memory may be adopted to exert the practically equivalent effects.

Another possible modification in the tone number conversion process of the second embodiment may store the tone error in the intermediate buffer, instead of accumulating the diffused errors or error divisions to be diffused to peripheral pixels in the respective registers. This modified procedure calculates final diffused errors or error divisions to be written into the error buffer, in response to storage of every new tone error. There is a difference in values stored in the intermediate buffer or registers, that is, the accumulated error divisions or the tone errors. They are, however, practically equivalent processes, since the same error divisions are written into the error buffer.

D. Third Embodiment

The embodiments discussed above use an identical error diffusion matrix for error diffusion. In the actual tone number conversion, however, in order to attain the desired picture quality, the procedure may selectively use an error diffusion matrix having a narrower diffusion range as in the case of FIG. 6(a) and another error diffusion matrix having a wider diffusion range as in the case of FIG. 6(c).

The error diffusion method may change over the selection among multiple error diffusion matrixes at random, in order to prevent formation of dots in a specific periodical pattern.

The technique disclosed in JAPANESE PATENT LAID-OPEN GAZETTE No. 7-226841 uses an error diffusion matrix having a wide diffusion range for error diffusion to improve the dispersibility of dots in a lower dot density area, when the tone value of image data is smaller than a sufficiently small preset threshold value and results in determining creation of a dot. The reason why such application improves the dispersibility of dots is not specifically described here. According to the technique disclosed in JAPANESE PATENT LAID-OPEN GAZETTE No. 7-226841, the procedure selectively uses the error diffusion matrix having the wider diffusion range shown in FIG. 6(c) when the tone number of image data is smaller than a sufficiently small preset threshold value thm and results in determining creation of a dot, while otherwise using the error diffusion matrix having the narrower diffusion range shown in FIG. 6(a). Application of a tone number conversion process in a third embodiment discussed below for this procedure effectively shortens the processing time required for the tone number conversion.

Figure 16:
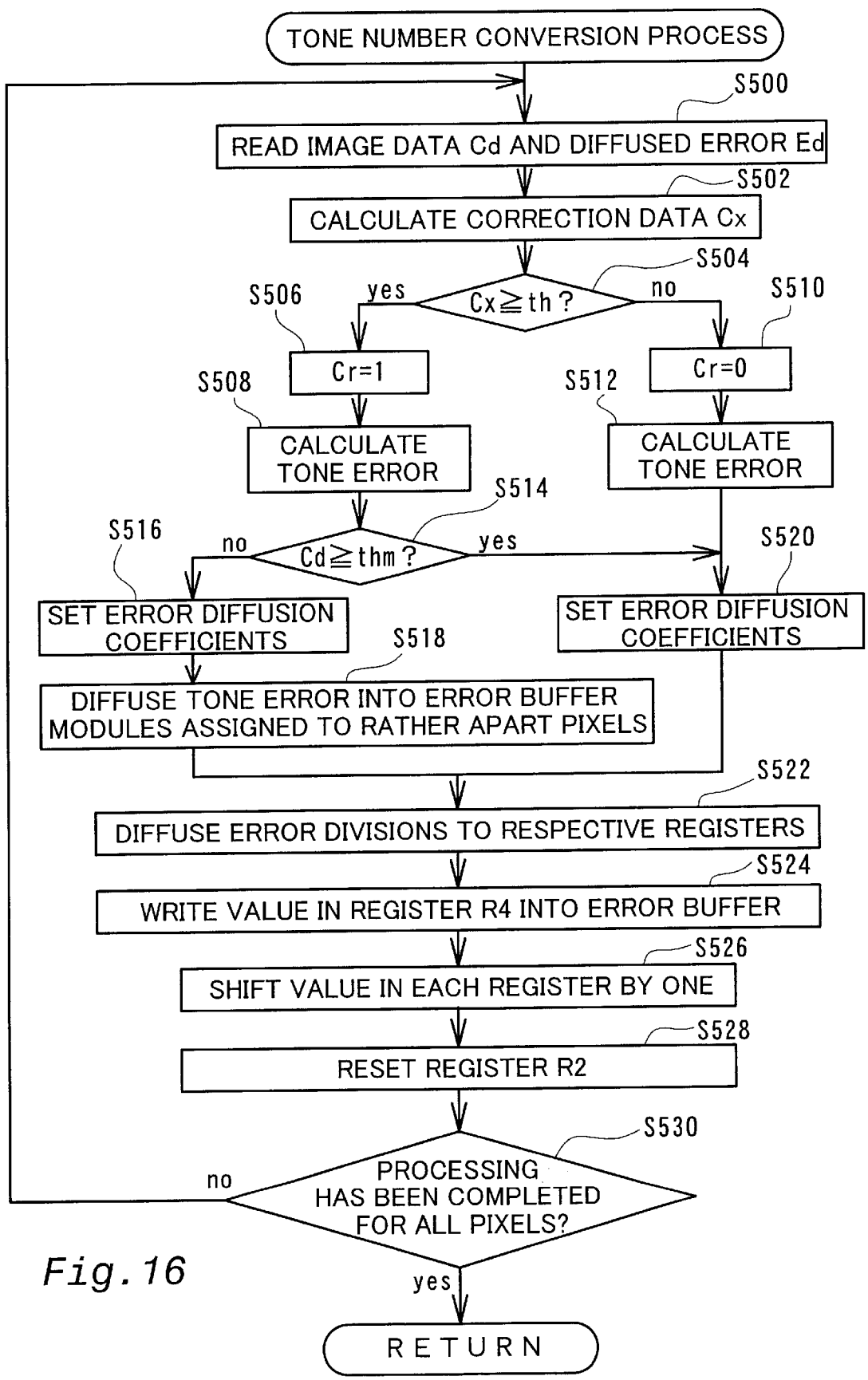
FIG. 16 is a flowchart showing the general flow of a tone number conversion process executed in a third embodiment.

FIG. 16 is a flowchart showing the general flow of the tone number conversion process of the third embodiment that changes over selection between two error diffusion matrixes. The tone number conversion process of the third embodiment is described below with reference to the flowchart of FIG. 16. Like the tone number conversion processes of the above embodiments, although the description below does not specify the ink color or the dot size for the clarity of explanation, the same series of processing is carried out for each ink color or for each dot size.

When entering the tone number conversion routine of the third embodiment, the CPU 102 first reads image data Cd and a diffused error Ed with regard to a pixel of interest from the RAM 106 at step S500, and sums up the input image data Cd, the input diffused error Ed, and the error division diffused from the left-side pixel and accumulated in the register R1, so as to calculate correction data Cx with regard to the pixel of interest at step S502. The calculated correction data Cx is compared with a preset threshold value th at step S504. In the case of an affirmative answer at step S504, that is, when the correction data Cx is not smaller than the preset threshold value th, the CPU 102 determines creation of a dot in the pixel of interest and writes the value '1' representing the dot on state into a variable Cr showing the result of determination at step S506. The CPU 102 then calculates a tone error arising in the pixel of interest due to the determination at step S508. In the case of a negative answer at step S504, that is, when the correction data Cx is smaller than the preset threshold value th, on the other hand, the CPU 102 determines creation of no dot in the pixel of interest and writes the value '0' representing the dot off state into the variable Cr at step S510. The CPU 102 then calculates a tone error arising in the pixel of interest due to the determination at step S512.

In the case where a dot is created in the pixel of interest, at step S514, the image data Cd of the pixel of interest is compared with a preset threshold value thm, which is used as the criterion of changing over the error diffusion matrix. In the case of a negative answer at step S514, that is, when the image data Cd is smaller than the preset threshold value thm, it is thought that a dot is created in the area of small image data by chance. The CPU 102 accordingly sets error diffusion coefficients according to an error diffusion matrix having a wider diffusion range, for example, the matrix shown in FIG. 6(c) at step S516. In the example of FIG. 6(c), the value '¼' is set to the error diffusion coefficient K10 in the pixel that is immediately below the pixel of interest. The value '⅛' is set to the error diffusion coefficients K01, K11, and K1-1 in the pixels that are right adjoining to, off to the lower right of, and off to the lower left of the pixel of interest. The value '1/16' is set to the error diffusion coefficients K02, K03, K12, K13, K1-2, and K1-3 in the pixels that are rather apart from the pixel of interest.

Figure 17:
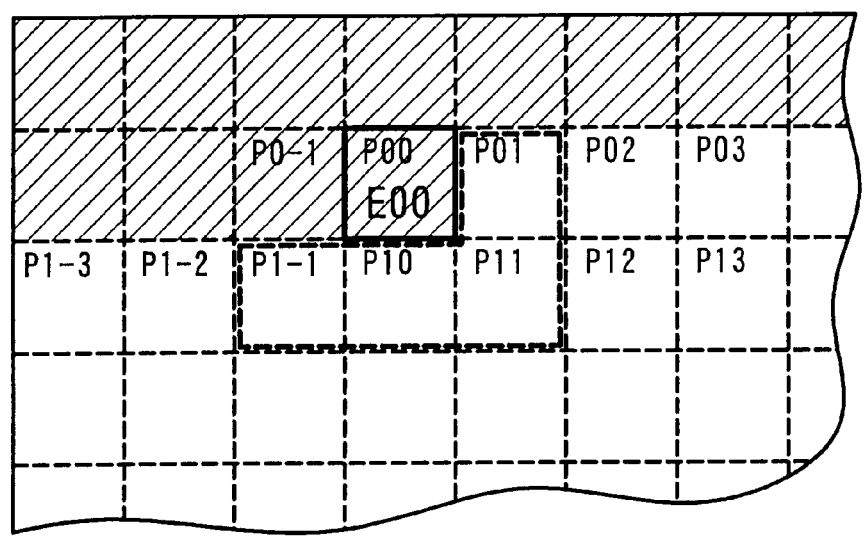
FIG. 17 shows diffusion of a tone error with an error diffusion matrix having a wider diffusion area and with another error diffusion matrix having a narrower diffusion area in the tone number conversion process of the third embodiment.

With regard to the six pixels that are rather apart from the pixel of interest, the value obtained by multiplying the tone error by the error diffusion coefficient mapped to each pixel is directly added to the corresponding error buffer module at step S518. This process is discussed below with reference to FIG. 17. FIG. 17 shows the state in which a tone error E00 arises in the pixel of interest P00, due to determination of the dot on-off state. The tone error E00 is diffused in a wide range with the error diffusion matrix shown in FIG. 6(c). While the tone error is generally diffused into four pixels surrounded by the thick broken line in FIG. 17, the tone error E00 arising in the pixel of interest P00 is diffused into the six peripheral pixels P02, P03, P12, P13, P1-2, and P1-3 outside the broken line range, in addition to the four pixels inside the broken line range. The processing of step S518 multiplies the tone error by the error diffusion matrix mapped to each of the six pixels and directly adds the obtained value to the error buffer module assigned to each pixel.

After the addition of the error division to the error buffer module assigned to each of the rather apart pixels, the CPU 102 diffuses the tone error into the registers assigned to the respective pixels surrounded by the thick broken line at step S522. The tone number conversion process of the third embodiment directly adds the error divisions to the error buffer modules assigned to the pixels rather apart from the pixel of interest, while utilizing the intermediate buffer for diffusion of the error divisions into the peripheral pixels close to the pixel of interest in the same manner as the first embodiment and the second embodiment discussed above. The following description regards the case of diffusing the tone error in conformity with the modified method of the second embodiment, that is, the case of adding the error divisions diffused to the pixels having the fixed positional relations to the pixel of interest to the respective registers.

The register R1 is updated with the value obtained by multiplying the tone error E00 by the error diffusion coefficient K01 mapped to the pixel that is right adjoining to the pixel of interest. The product of the tone error E00 and the error diffusion coefficient K11 is added to the register R2. The product of the tone error E00 and the error diffusion coefficient K01 is added to the register R3. The product of the tone error E00 and the error diffusion coefficient K1-1 is added to the register R4. This state is equivalent to the state of FIG. 15(a). After this series of processing at step S522, the sum of the error divisions accumulated in the register R4 is written into the error buffer module assigned to the corresponding pixel at step S524. In the example of FIG. 17, the pixel of interest is the pixel P00, so that the value accumulated in the register R4 is added to the error buffer module assigned to the pixel P1-1. On completion of the process of writing the accumulated value into the error buffer, the CPU 102 respectively shifts the value accumulated in the register R3 to the register R4 and the value accumulated in the register R2 to the register R3 at step S526. After shifting the value accumulated in each register, the CPU 102 resets the register R2 at step S528.

When no dot is created in the pixel of interest (that is, in the case of a negative answer at step S504) or when the image data Cd is not smaller than the preset threshold value thm under the condition of creating a dot in the pixel of interest (that is, in the case of an affirmative answer at step S514), on the other hand, the CPU 102 sets error diffusion coefficients according to another error diffusion matrix having a narrower diffusion range, for example, the matrix shown in FIG. 6(a) at step S520. The concrete procedure sets the value '¼' to the error diffusion coefficients mapped to the four peripheral pixels in the vicinity of the pixel of interest according to the error diffusion matrix of FIG. 6(a). The procedure then carries out the processing of steps S522 to S528 discussed above with such settings of the error diffusion coefficients, so as to write the error divisions accumulated in the register R4 into the error buffer.

After determining the dot on-off state in the current pixel of interest and writing the diffused errors or error divisions with regard to one pixel into the error buffer, the CPU 102 determines whether or not the processing has already been concluded for all the pixels at step S530. When there are any non-processed pixels, the program returns to step S500 to read image data Cd and a diffused error Ed with regard to a new pixel of interest from the RAM 106, and subsequently to step S502 to sum up these input values and the error division accumulated in the register R1 to calculate correction data Cx with regard to the new pixel of interest. Until the processing has been concluded for all the pixels, the procedure repeats the above series of processing. When the processing has been concluded for all the pixels, the program exits from the tone number conversion routine of the third embodiment shown in FIG. 16 and returns to the image data conversion process of FIG. 4.

The tone number conversion process of the third embodiment selectively uses the error diffusion matrix having the wider diffusion range and the error diffusion matrix having the narrower diffusion range for error diffusion, thus efficiently shortening the processing time. In the case of using the error diffusion matrix having the wider diffusion range shown in FIG. 6(c), a large number of registers are required to accumulate all the error divisions therein. The example of FIG. 17 requires registers for a total of 10 pixels, that is, registers assigned to 4 pixels inside the broken line range and registers assigned to 6 pixels outside the broken line range. Irrespective of the application of either the method of the second embodiment utilizing the flag or the method of the modified example of the second embodiment shifting the value accumulated in each register for addition of the error divisions to the respective registers, the large number of registers need the longer time for their operations and thereby undesirably extend the total processing time.

The method of the third embodiment, on the other hand, executes the tone number conversion process without increasing the number of registers used for addition of the error divisions, even when the selected matrix is an error diffusion matrix having an extremely wide diffusion range. The arrangement of the third embodiment simplifies the whole processing flow and effectively prevents extension of the processing time.

As described previously, the error diffusion matrix having the wide diffusion range is selected in the case where the tone value of the image data is sufficiently small and results in determining creation of a dot. When the tone value of the image data is sufficiently small, there is a low probability of specifying creation of a dot. Namely the error diffusion matrix having the wide diffusion range is less frequently used. The preferable procedure thus selects rather time-consuming, direct addition of the error divisions to the error buffer in the rare case with requirement of error diffusion into a wide range, while utilizing the intermediate buffer to attain quick error diffusion in the general case without requirement of error diffusion into the wide range. This arrangement ensures the high-speed tone number conversion as a whole. In the case of error diffusion into the wide range, the procedure directly adds the error divisions to the error buffer modules assigned to pixels rather apart from the pixel of interest. This desirably saves the number of registers applied for the intermediate buffer and enables the marginal registers to be used for different processing, thus further enhancing the processing efficiency.

The method of the third embodiment selectively changes over the error diffusion matrix and carries out direct diffusion of the tone error into pixels rather apart from the pixel of interest only in the case of selection of the error diffusion matrix having the wider diffusion range. This technique is not restricted to the arrangement of changing over the error diffusion matrix. For example, when a matrix having a wide diffusion range is applied for the error diffusion matrix, the procedure may directly diffuse error divisions into pixels rather apart from the pixel of interest, while utilizing the intermediate buffer to collectively diffuse tone errors arising in a preset number of pixels into peripheral pixels closer to the preset number of pixels. This arrangement desirably saves the intermediate buffer required for storage of diffused errors.

Any of the diverse methods discussed previously as the first and second embodiments and their modifications, which utilizes the intermediate buffer to collectively diffuse tone errors arising in a preset number of pixels into peripheral pixels, may preferably be applied for the method of the third embodiment.

E. Fourth Embodiment

Any of the above methods in the respective embodiments and their modifications eventually diffuses the tone error into the error buffer modules assigned to the respective peripheral pixels. From this point of view, these methods are similar to the error diffusion method. The technique of utilizing the intermediate buffer may also be applied for the least mean square error method to shorten the processing time required for determination of the dot on-off state. The least mean square error method registers a tone error, which arises in each pixel due to determination of the dot on-off state, in the pixel and reads tone errors registered in peripheral pixels to determine the dot on-off state in each unprocessed pixel. The following description regards a tone number conversion process of a fourth embodiment according to this application.

Figure 18A:
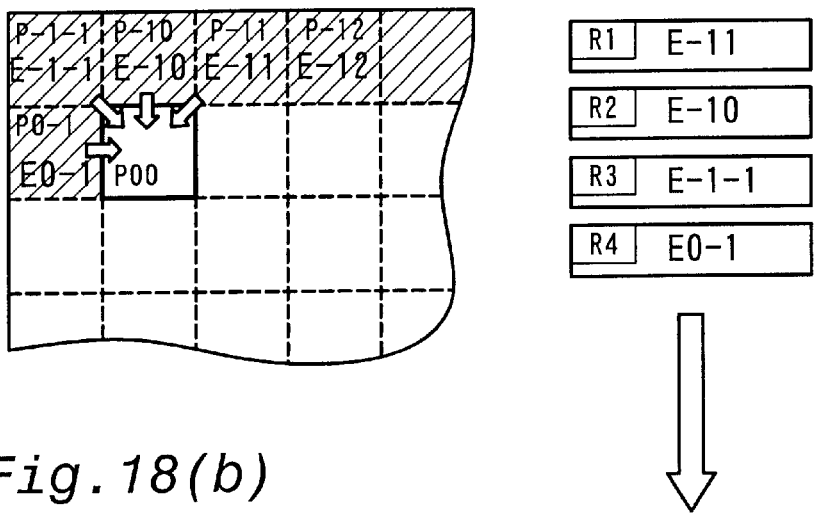
FIG. 18 shows the principles of shortening the processing time in a tone number conversion process of a fourth embodiment.

E-1. Principles of Shortening Time required for Tone Number Conversion Process in Fourth Embodiment FIG. 18 shows the principles of shortening the processing time required for determination of the dot on-off state by utilizing the intermediate buffer in the method of the fourth embodiment. FIG. 18(a) shows the process of determining the dot on-off state with regard to a pixel of interest P00. Prior to description of the method of the fourth embodiment, the following briefly describes the least mean square error method with reference to FIG. 18(a).

The least mean square error method stores the tone error, which arises in each pixel due to determination of the dot on-off state in the pixel, into the error buffer module assigned to the pixel. In the example of FIG. 18(a), the symbol 'E0-1' represents a tone error arising in a pixel P0-1, and 'E0-1' written inside the pixel P0-1 schematically shows that the tone error E0-1 is stored in the error buffer module assigned to the pixel P0-1. Hatched squares represent pixels that have already undergone determination of the dot on-off state. As shown in FIG. 18(a), the least mean square error method stores the tone error in each processed pixel. The method reads tone errors from peripheral processed pixels and determines the dot on-off state in a non-processed pixel of interest P00 by taking into account these tone errors. Preset weighting factors, for example, those shown in FIG. 19, are mapped to peripheral pixels having specific positional relations to the pixel of interest. The procedure multiplies the tone errors read from the respective peripheral pixels by the preset weighting factors and corrects image data of the pixel of interest with the obtained value, so as to calculate correction data of the pixel of interest. In the drawing of FIG. 19, each hatched square represents the pixel of interest, and the numerical value written in each pixel shows the weighting factor set for the pixel. The procedure compares the calculated correction data with a preset threshold value to determine the dot on-off state in the pixel of interest. The procedure subsequently calculates a tone error arising in the pixel of interest due to determination of the dot on-off state in the pixel, and stores the calculated tone error in the error buffer module assigned to the pixel of interest. The least mean square error method repeats the above series of processing to determine the dot on-off state in respective pixels.

As described above, the least mean square error method should read tone errors of pixels from the error buffer every time the dot on-off state is determined for one pixel. This method accordingly requires some time for determination of the dot on-off state.

The tone number conversion process of the fourth embodiment discussed below utilizes the intermediate buffer to attain the higher-speed determination of the dot on-off state, while being mathematically equivalent to the least mean square error method described above. The following describes the principles of shortening the processing time in the tone number conversion process of the fourth embodiment, in comparison to the least mean square error method, with reference to FIG. 18. For the clarity of explanation, it is here assumed that the settings of weighting factors shown in FIG. 19(a) are used for the processing.

FIG. 18(a) shows the process of determining the dot on-off state in the pixel of interest P00 according to the tone number conversion process of the fourth embodiment. Like the least mean square error method discussed above, a tone error E-1-1 arising in a pixel P-1-1, a tone error E-10 arising in a pixel P-10, a tone error E-11 arising in a pixel P-11, and a tone error E0-1 arising in a pixel P0-1 are used for the determination of the dot on-off state in the pixel of interest P00. Four rectangles on the right side of FIG. 18(a) schematically represent four registers used for the intermediate buffer. For convenience of explanation, the respective registers are distinguished from one another by symbols R1, R2, R3, and R4.

Each register is overwritten with the tone error arising in a certain pixel having a predetermined positional relation to the pixel of interest. The tone error arising in a pixel that is off to the upper right of the pixel of interest is always stored in the register R1. The tone error arising in a pixel that is immediately above the pixel of interest is always stored in the register R2. The tone error arising in a pixel that is off to the upper left of the pixel of interest is always stored in the register R3. The tone error arising in a pixel that is left adjoining to the pixel of interest is always stored in the register R4. The process of storing the tone errors in the respective registers will be discussed later.

The tone error conversion process of the fourth embodiment calculates correction data with regard to the pixel of interest by taking into account the tone errors of the respective pixels stored in the four registers and weighting factors preset for the respective pixels. The method of the fourth embodiment stores the tone errors of the respective pixels in the assigned registers, whereas the least mean square error method discussed above reads the tone errors of the respective pixels from the error buffer. The procedure compares the calculated correction data with a preset threshold value to determine the dot on-off state in the pixel of interest P00. The procedure then calculates a tone error E00 arising in the pixel of interest P00 due to the determination. The tone error is obtained by subtracting the resulting value from the correction data with regard to the pixel of interest.

Figure 18B:
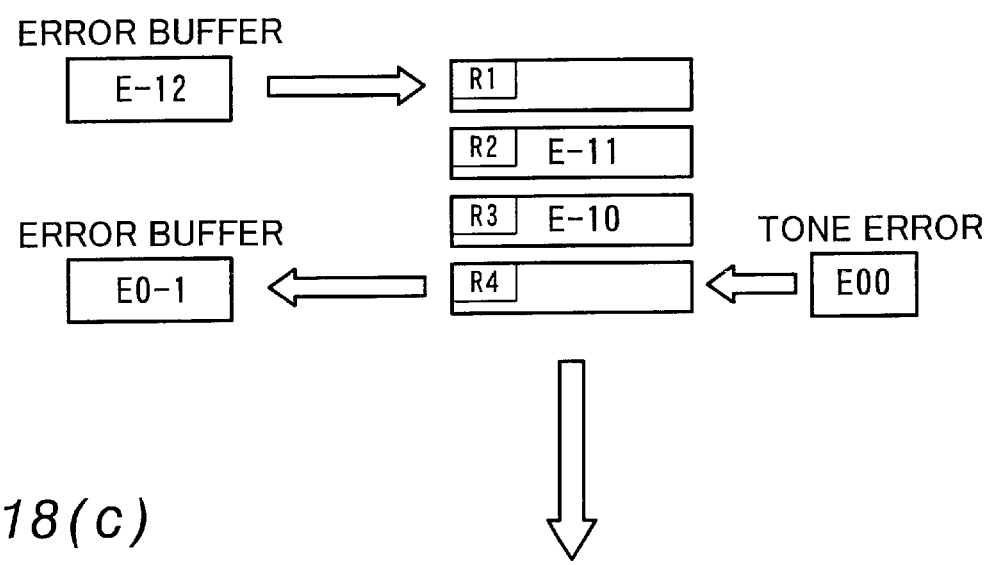

After calculating the tone error E00 in the pixel of interest P00, the procedure causes the respective registers to undergo the processing shown in FIG. 18(b) to determine the dot on-off state in a new pixel of interest. The procedure first writes the tone error stored in the register R4 into the error buffer. As described above with reference FIG. 18(a), the tone error arising in the pixel left adjoining to the pixel of interest is always stored in the register R4. The value stored in the register R4 is accordingly written into the error buffer module assigned to the pixel left adjoining to the pixel of interest. The procedure subsequently overwrites the register R4 with the calculated tone error E00 in the pixel P00, and shifts the value in the register R2 to the register R3 and the value in the register R1 to the register R2, respectively. The values in the respective registers are thus shifted with the shift in pixel of interest from the pixel P00 to its right-side pixel P01. This is attained at a significantly high speed, since the only requirement is simple movement of data between the registers incorporated in the CPU 102. The procedure then reads the tone error in a pixel that is off to the upper right of the new pixel of interest from the error buffer and stores the tone error into the register R1.

Figure 18C:
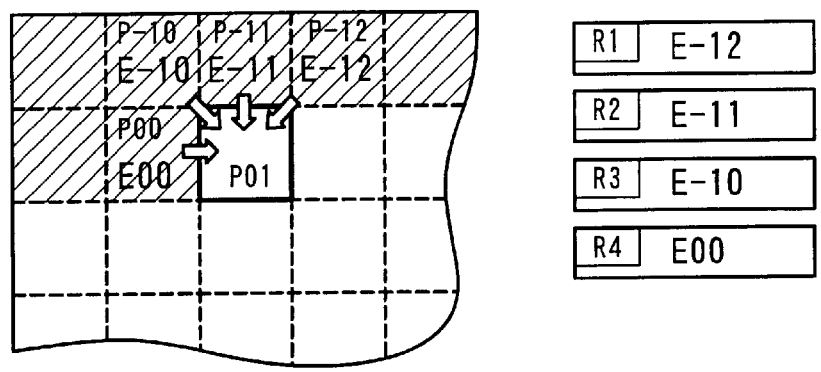

The above series of processing causes the values stored in the respective registers to be changed from the state of FIG. 18(a) to the state of FIG. 18(c). As clearly understood from the comparison between FIGS. 18(a) and 18(c), the values stored in the respective registers in the state of FIG. 18(c) are changed from the state of FIG. 18(a) with the shift in pixel of interest from the pixel P00 to the pixel P01. The above series of processing is repeatedly carried out to successively determine the dot on-off state in new pixels of interest. The method of the fourth embodiment stores the continuously used tone errors in the registers, thus significantly reducing the frequency of reading the tone error from the error buffer.

E-2. Tone Number Conversion Process in Fourth Embodiment

Figure 20:
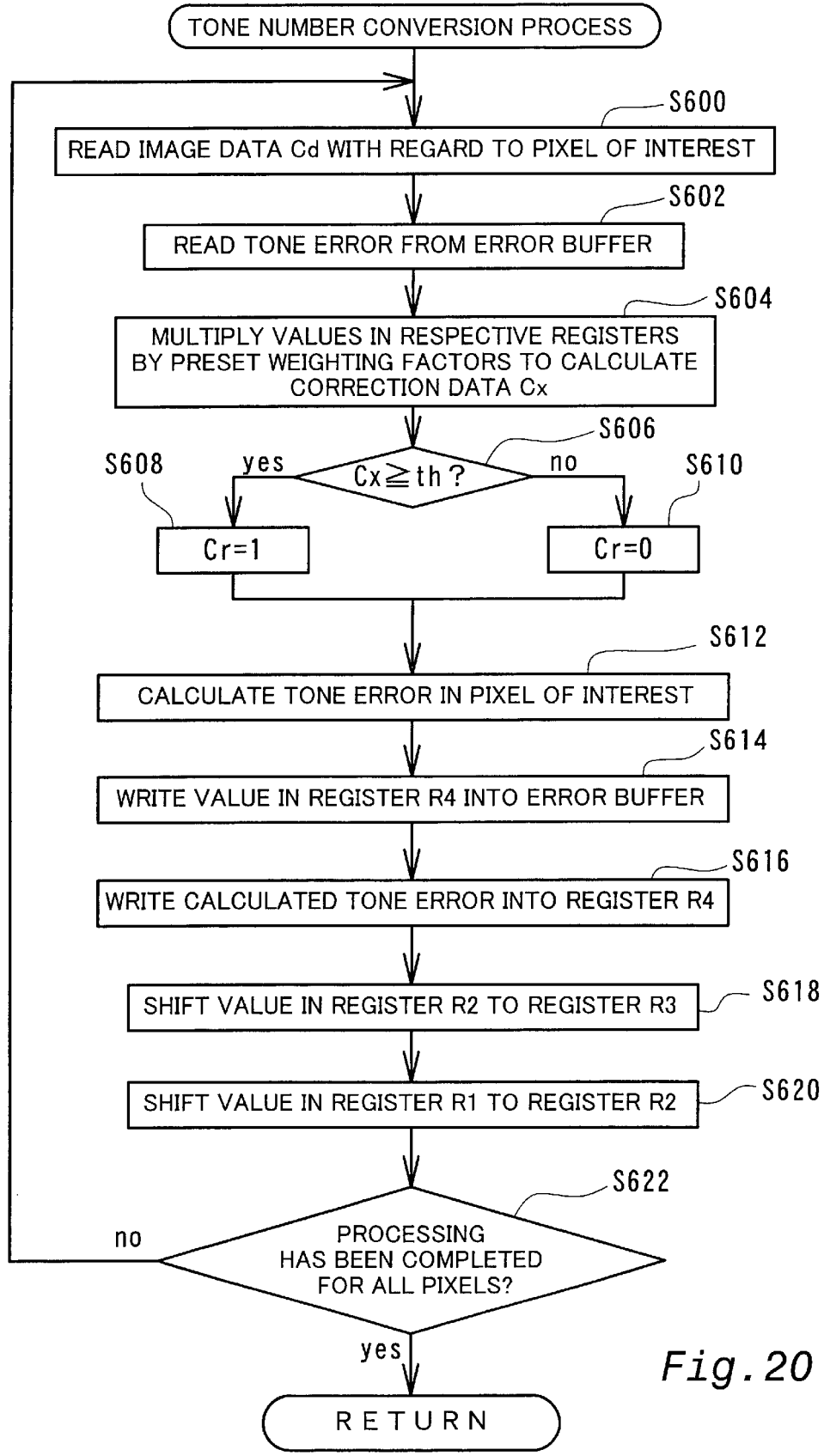
FIG. 20 is a flowchart showing the general flow of the tone number conversion process executed in the fourth embodiment.

The actual processing flow of the tone number conversion process of the fourth embodiment is briefly described below. FIG. 20 is a flowchart showing the general flow of the tone number conversion process executed in the fourth embodiment. Like the tone number conversion processes of the other embodiments discussed above, although the description below does not specify the ink color or the dot size for the clarity of explanation, the same series of processing is carried out for each ink color or for each dot size.

When entering the tone number conversion routine of the fourth embodiment, the CPU 102 first reads image data Cd with regard to a pixel of interest at step S600, and reads a tone error arising in a pixel off to the upper right of the pixel of interest from the error buffer and stores the tone error into the register R1 at step S602. The tone errors arising in peripheral pixels in the vicinity of the pixel of interest are accordingly stored in the respective registers, as discussed above with reference to FIG. 18.

The CPU 102 then multiplies the tone errors stored in the respective registers by preset weighting factors, so as to calculate correction data Cx with regard to the pixel of interest at step S604. As shown in FIG. 19, the preset weighting factors are set for the respective peripheral pixels in the vicinity of the pixel of interest. The processing of step S604 multiplies the tone errors stored in the respective registers by the preset weighting factors, and sums up the calculated values and the input image data Cd to determine the correction data Cx in the pixel of interest. The calculated correction data Cx is subsequently compared with a preset threshold value th at step S606. When the correction data Cx is not smaller than the preset threshold value th, the CPU 102 determines creation of a dot in the pixel of interest and writes the value '1' representing the dot on state into a variable Cr showing the result of determination at step S608. Otherwise the CPU 102 determines creation of no dot in the pixel of interest and writes the value '0' representing the dot off state into the variable Cr at step S610. The CPU 102 then calculates a tone error arising in the pixel of interest due to the determination at step S612. As discussed in the above embodiments, the tone error is calculated by subtracting the resulting value from the correction data with regard to the pixel of interest.

After the calculation of the tone error arising in the pixel of interest, the respective registers undergo a series of operations as described previously with reference to FIG. 18(b). The CPU 102 writes the tone error stored in the register R4 into the error buffer at step S614, and writes the tone error calculated at step S612 into the register R4 at step S616. The CPU 102 then shifts the value in the register R2 to the register R3 at step S618, and shifts the value in the register R1 to the register R2 at step S620.

The CPU 102 determines whether or not the processing has been completed for all the pixels at step S622. When there are any non-processed pixels, the program returns to step S600 and repeats the series of processing discussed above. When the processing has been concluded for all the pixels, the program exits from the tone number conversion routine of the fourth embodiment shown in FIG. 20 and returns to the image data conversion process of FIG. 4.

The tone number conversion process of the fourth embodiment discussed above reads the tone error of one pixel from the error buffer every time the dot on-off state is determined for one pixel. As explained previously, the least mean square error method should read the tone errors of four pixels from the error buffer every time the dot on-off state is determined for one pixel. The method of the fourth embodiment desirably reduces the frequency of reading and writing data from and into the error buffer, thus attaining high-speed tone number conversion. The method of the fourth embodiment is mathematically equivalent to the least mean square error method, and ensures high-quality printing as in the case of application of the least mean square error method.

The fourth embodiment uses the settings shown in FIG. 19(a) for the weighting factors. The actual weighting factors are not restricted to the settings shown in FIG. 19 but may be any adequate settings for the desired picture quality. The procedure of the fourth embodiment uses the four registers for the intermediate buffer corresponding to the settings shown in FIG. 19(a). A greater number of registers may be required according to the settings of weighting factors.

The fourth embodiment discussed above uses the registers incorporated in the CPU 102 for the intermediate buffer. Any other storage element that allows high-speed reading and writing operations, such as a cache memory, may replace the registers.

The above embodiments and their modifications are to be considered in all aspects as illustrative and not restrictive.

There may be many modifications, changes, and alterations without departing from the scope or spirit of the main characteristics of the present invention.

For example, in all the above embodiments and their modifications, the dot on-off state is determined, based on the result of comparison between the correction data of each pixel and a preset threshold value. Any of the other known techniques may alternatively be adopted to determine the dot on-off state.

For the clarity of explanation, any of the above embodiments and their modifications uses only one type of dots and allows selection only between the dot on state and the dot off state in each pixel. The technique of the present invention is applicable to the printer that is capable of creating different types of dots, for example, variable-sized dots or dots having different ink densities. In the printer that creates two variable-sized dots, that is, a large-sized dot and a small-sized dot, the procedure of the present invention may be modified to determine the dot on-off state in the following manner. Two threshold values th1 and th2 (where th1>th2) are set in advance. The procedure determines creation of a large-sized dot in a pixel when the correction data of the pixel is greater than the threshold value th1, determines creation of a small-sized dot when the correction data is smaller than the threshold value th1 but greater than the threshold value th2, and determines creation of no dot when the correction data is smaller than the threshold value th2. The tone error arising in each pixel is calculated by subtracting the resulting value from the correction data of the pixel.

In each of the embodiments and their modifications discussed above, error buffer modules should be provided logically for all pixels. In the actual system, however, error buffer modules are provided for multiple raster lines, and the error buffer module assigned to one processed pixel is reallocated to a non-processed pixel after determination of the dot on-off state in the processed pixel. For the clarity of explanation, it is assumed that error buffer modules are provided for all pixels in the above embodiments and their modifications. Any of these procedures is effectively applicable to the case of repeatedly using error buffer modules for multiple raster lines.

The software programs (application programs) to actualize the functions discussed above may be supplied into the main memory of the computer system or into an external storage device via a communication line. The software programs may alternatively be read from recording media, such as CD-ROMS and floppy disks.

In the embodiments and their modifications discussed above, the image data conversion process including the tone number conversion is carried out in the computer. Part or all of the image data conversion process may alternatively be executed in the printer or any special image processing apparatus.

The image display device is not restricted to the printing apparatus that creates ink dots on a printing medium to print an image. For example, the technique of the present invention may be applied for a liquid crystal display device that disperses luminescence spots on the screen of a liquid crystal display at appropriate densities, so as to express an image with a continuously varying tone.

The scope and spirit of the present invention are indicated by the appended claims, rather than by the foregoing description.

What is claimed is:

1. An image processing apparatus that receives image data represented by a tone value of each pixel, determines dot on-off state in each pixel by taking into account the tone value of the pixel, and converts the image data into a specific expression format based on the dot on-off state, said image processing apparatus comprising:

a tone error registration unit that calculates a tone error arising in each pixel due to determination of the dot on-off state in the pixel, based on a result of the determination of the dot on-off state, and temporarily registers a preset number of the calculated tone errors in a temporary memory;

a diffusion error storage unit that calculates diffusion errors diffused to each of non-processed pixels, which are in a neighborhood of the preset number of pixels and have not yet been subjected to the determination of the dot on-off state, based on the tone errors registered in the temporary memory, and stores the calculated diffusion errors into an error memory assigned to the each non-processed pixel; and a dot creation decision unit that determines the dot on-off state in each non-processed pixel, based on the tone value of the each non-processed pixel, by taking into account the calculated diffusion errors.

2. An image processing apparatus in accordance with claim 1, wherein said tone error registration unit enables a higher-speed operation of reading and writing the tone error than said diffusion error storage unit.

3. An image processing apparatus in accordance with claim 1, wherein said diffusion error storage unit comprises:

an error division accumulation unit that calculates an error division of each temporarily registered tone error, which is to be distributed to each of the non-processed pixels, and accumulates the calculated error division in the temporary memory assigned to the each non-processed pixel; and a diffusion error accumulation unit that, every time error divisions with regard to the preset number of pixels are accumulated, writes all the accumulated error divisions into the error memory assigned to each non-processed pixel as the diffusion errors.

4. An image processing apparatus in accordance with claim 1, wherein said tone error registration unit temporarily registers the tone errors arising in the preset number of pixels, and said diffusion error storage unit calculates diffusion errors diffused to each of the non-processed pixels based on the registered tone errors with regard to the preset number of pixels, and writes all the calculated diffusion errors into the error memory assigned to the each non-processed pixel.

5. An image processing apparatus in accordance with claim 1, wherein said diffusion error storage unit comprises:

an error division accumulation unit that calculates an error division of each temporarily registered tone error, which is to be distributed to each of the non-processed pixels, and accumulates the calculated error division in the temporary memory assigned to the each non-processed pixel; and an error division storage unit that stores error divisions, which are distributed from the preset number of pixels and accumulated in each of the non-processed pixels, into the error memory assigned to the each non-processed pixel.

6. An image processing apparatus in accordance with claim 1, wherein said tone error registration unit temporarily registers tone errors arising in the preset number of pixels in the temporary memory, and said diffusion error storage unit calculates diffusion errors diffused to a specific pixel which is included in the non-processed pixels and receives diffusion errors from all the temporarily registered tone errors with regard to the preset number of pixels, and stores the calculated diffusion errors into the error memory assigned to the specific pixel.

7. An image processing apparatus in accordance with claim 1, wherein said diffusion error storage unit comprises:

a first diffusion error storage unit that calculates diffusion errors diffused to each of first non-processed pixels, which are inside a predetermined first area in the neighborhood of the preset number of pixels, based on the tone errors with regard to the preset number of pixels, and stores the calculated diffusion errors in the error memory assigned to the each first non-processed pixel; and a second diffusion error storage unit that, every time a tone error is calculated, calculates based on the calculated tone error a diffusion error diffused to each of second non-processed pixels, which are outside the predetermined first area but still in the neighborhood of the preset number of pixels, and stores the calculated diffusion error into the error memory assigned to the each second non-processed pixel.

8. An image processing apparatus in accordance with claim 7, wherein said second diffusion error storage unit calculates and stores the diffusion error diffused to each of the second non-processed pixels, which are inside a predetermined second area including the predetermined first area.

9. An image processing apparatus in accordance with claim 8, said image processing apparatus further comprising:

a diffusion range changeover unit that selectively changes over a diffusion range of diffusing the tone error into non-processed pixels, between the predetermined first area in the neighborhood of the preset number of pixels and the predetermined second area including the predetermined fist area, according to a condition relating to the determination of the dot on-off state.

10. An image processing apparatus in accordance with claim 9, wherein said diffusion range changeover unit selectively changes over the diffusion range of diffusing the tone error into the non-processed pixels, based on the tone values of the preset number of pixels and results of the determination of the dot on-off state in the preset number of pixels as the condition relating to the determination of the dot on-off state.

11. An image processing apparatus in accordance with claim 1, wherein said diffusion error storage unit calculates diffusion errors diffused to the each non-processed pixel based on tone errors arising in a plurality of adjoining pixels, which are specified as the preset number of pixels, and stores the calculated diffusion errors into the error memory assigned to the each non-processed pixel.

12. An image processing apparatus in accordance with claim 11, wherein said dot creation decision unit determines the dot on-off state in the each non-processed pixel by taking into account the calculated diffusion errors stored in the error memory assigned to the each non-processed pixel aid a diffusion error diffusion from a pixel adjoining to the non-processed pixel.

13. An image processing apparatus that receives image data represented by a tone value of each pixel, determines dot on-off state in each pixel by taking into account the tone value of the pixel, and converts the image data into a specific expression format based on the dot on-off state, said image processing apparatus comprising:

a tone error storage unit that calculates a tone error arising in each pixel due to determination of the dot on-off state in the pixel, based on a result of the determination of the dot on-off state, and stores the calculated tone error in an error memory assigned to the each pixel;

a tone error registration unit that registers the tone error in a temporary memory assigned to each processed pixel, which has already undergone the determination of the dot on-off state and is in a neighborhood of a current pixel of interest that is a current object of the determination of the dot on-off state;

a dot creation decision unit that determines the dot on-off state in the current pixel of interest, based on the tone value of the current pixel of interest, by taking into account the tone error registered in the temporary memory assigned to the each processed pixel; and a tone error updating unit that detects processed pixels in a neighborhood of a next pixel of interest, which is a next object of the determination of the dot on-off state after the current pixel of interest, reads a tone error of a specific processed pixel, which is among the detected processed pixels and does not have the registered tone error in the temporary memory, from the error memory assigned each pixel, and updates a tone error that is not used for the determination of the dot on-off state in the next pixel of interest to the tone error read from the error memory, so as to cause the updated tone error to be used for the determination of the dot on-off state in the next pixel of interest.

14. An image processing apparatus in accordance with claim 13, said image processing apparatus further comprising:

a temporary registration unit that temporarily registers therein a tone error arising in the current pixel of interest, wherein said tone error updating unit updates the tone error tat is not used for that determination on of the dot on-off state in the next pixel of interest to the tone error registered in the temporary registration unit.

15. An image processing method that receives image data represented by a tone value of each pixel, determines dot on-off state in each pixel by taking into account the tone value of the pixel, and converts the image data into a specific expression format based on the dot on-off state, said method comprising the steps of:

calculating a tone error arising in each pixel due to determination of the dot on-off state in the pixel, based on a result of the determination of the dot on-off state, and temporarily registering a preset number of the calculated tone error in a temporary memory;

calculating diffusion errors diffused to each of non-processed pixels, which are in a neighborhood of the preset amber of pixels and have not yet been subjected to the determination of the dot on-off state, based on the tone errors registered in the temporary memory;

storing the calculated diffusion errors into an error memory assigned to the each non-processed pixel; and determining the dot on-off state in each non-processed pixel, based on the tone value of the each non-processed pixel, by taking into account the calculated diffusion errors.

16. An image processing method that receives image data represented by a tone value of each pixel, determines dot on-off state in each pixel by taking into account the tone value of the pixel and converts the image data into a specific expression format based on the dot on-off state, said method comprising the steps of:

calculating a tone error arising in each pixel due to determination of the dot on-off state in the pixel, based on a result of the determination of the dot on-off state, and storing the calculated tone error in an error memory assigned to the each pixel;

registering the tone error in a temporary memory assigned to each processed pixel, which has already undergone the determination of the dot on-off state and is in a neighborhood of a current pixel of interest that is a current object of the determination of the dot on-off state;

determining the dot on-off state in the current pixel of interest, based on the tone value of the current pixel of interest, by taking into account the tone error registered in the temporary memory assigned to the each processed pixel;

detecting processed pixels in a neighborhood of a next pixel of interest, which is a next object of the determination of the dot on-off state after the current pixel of interest; and reading out a tone error of a specific processed pixel which is among the detected processed pixels and does not have the registered tone error in the temporary memory, from the error memory assigned each pixel, and updating a tone error that is not used for the determination of the dot on-off state in the next pixel of interest to the read-out tone error, so as to cause the updated tone error to be used for the determination of the dot on-off state in the next pixel of interest.

17. A print control apparatus that receives image data represented by a tone value of each pixel, determines dot on-off state in each pixel by taking into account the tone value of the pixel, converts the image data into print data in a specific expression format based on the dot on-off state, and outputs the print data to a printing device, which creates ink dots on a printing medium to print an image, so as to control said printing device, said print control apparatus comprising:

a tone error registration unit that calculates a tone error arising in each pixel due to determination of the dot on-off state in the pixel, based on a result of the determination of the dot on-off state, and temporarily registers the calculated tone error in a temporary memory;

a diffusion error storage unit that calculates diffusion errors diffused to each of non-processed pixels, which are in a neighborhood of a preset number of pixels and have not yet been subjected to the determination of the dot on-off state, based on the tone errors registered in the temporary memory, and stores the calculated diffusion errors into an error memory assigned to the each non-processed pixel;

a dot creation decision unit that determines the dot on-off state in each non-processed pixel, based on the tone value of the each non-processed pixel, by taking into account the calculated diffusion errors; and a print data output unit that converts the image data into the print data based on results of the determination of the dot on-off state, and outputs the print data to said printing device.

18. A print control apparatus that receives image data represented by a tone value of each pixel, determines dot on-off state in each pixel by taking into account the tone value of the pixel, converts the image data into print data in a specific expression format based on the dot on-off state, and outputs the print data to a printing device, which creates ink dots on a printing medium to print an image, so as to control said printing device, said print control apparatus comprising:

a tone error storage unit that calculates a tone error arising in each pixel due to determination of the dot on-off state in the pixel, based on a result of the determination of the dot on-off state, and stores the calculated tone error in a error memory assigned to the each pixel;

a tone error registration unit that registers a tone error in a temporary memory assigned to each processed pixel, which has already undergone the determination of the dot on-off state and is in a neighborhood of a current pixel of interest that is a current object of the determination of the dot on-off state;

a dot creation decision unit that determines the dot on-off state in the current pixel of interest, based on the tone value of the current pixel of interest, by taking into account the tone error registered in the temporary memory assigned to the each processed pixel;

a tone error updating unit that detects processed pixels in a neighborhood of a next pixel of interest, which is a next object of the determination of the dot on-off state at the current pixel of interest, reads a tone error of a specific processed pixel, which is among the detected processed pixels and does not have the registered tone error in the temporary memory, from the error memory assigned each pixel, and updates a tone error that is not used for the determination of the dot on-off state in the next pixel of interest to the tone error read from the error memory, so as to cause the updated tone error to be used for the determination of the dot on-off state in the next pixel of interest; and a print data output unit that converts the image data into the print data based on results of the determination of the dot on-off state, and outputs the print data to said printing device.

19. A recording medium in which a program is recorded in a computer readable manner, said program actualizing a method that receives image data representing a tone value of each pixel, determines dot on-off state in each pixel by taking into account the tone value of the pixel, and converts the image data into a specific expression format based on the dot on-off state, said program causing a computer to attain the functions of:

calculating a tone error arising in each pixel due to determination of the dot on-off state in the pixel, based on a result of the determination of the dot on-off state, and temporarily registering the calculated tone error in a temporary memory;

calculating diffusion errors diffused to each of non-processed pixels, which are in a neighborhood of a preset number of pixels and have not yet been subjected to the determination of the dot on-off state, based on the tone errors registered in the temporary memory;

storing the calculated diffusion errors into an error memory assigned to the each non-processed pixel; and determining the dot on-off state in each non-processed pixel, based on the tone value of the each non-processed pixel, by taking into account the calculated diffusion errors.

20. A recording medium in which a program is recorded in a computer readable manner said program actualizing a method that receives image data representing a tone value of each pixel, determines dot on-off state in each pixel by taking into account the tone value of the pixel, and converts the image data into a specific expression format based on the dot on-off state, said program causing a computer to attain the functions of:

calculating a tone error arising in each pixel due to determination of the dot on-off state in the pixel, based on a result of the determination of the dot on-off state, and storing the calculated tone error in an error memory assigned to the each pixel;

registering a tone error in a temporary memory assigned to each processed pixel which has already undergone the determination of the dot on-off state and is in a neighborhood of a current pixel of interest that is a current object of the determination of the dot on-off state;

determining the dot on-off state in the current pixel of interest, based on the tone value of the current pixel of interest, by taking into account the tone error registered in the temporary memory assigned to the each processed pixel;

detecting processed pixels in a neighborhood of a next pixel of interest, which is a next object of the determination of the dot on-off state after the current pixel of interest; and reading out a tone error of a specific processed pixel, which is among the detected processed pixels and does not have the registered tone error in the temporary memory, from the error memory assigned each pixel, and updating a tone error that is not used for the determination of the dot on-off state in the next pixel of interest to the read-out tone error, so as to cause the updated tone error to be used for the determination of the dot on-off state in the next pixel of interest.

21. A program for actualizing a method tat receives image data representing a tone value of each pixel, determines dot on-off state in each pixel by taking into account the tone value of the pixel, and converts the image data into a specific expression format based on the dot on-off state, said program causing a computer to attain the functions of:

calculating a tone error arising in each pixel due to determination of the dot on-off state in the pixel, based on a result of the determination of the dot on-off state, and temporarily registering the calculated to tone error in a temporary memory;

calculating diffusion errors diffused to each of non-processed pixels, which are in a neighborhood of a preset number of pixels and have not yet been subjected to the determination of the dot on-off state, based on the tone errors registered in the temporary memory;

storing the calculated diffusion errors into an error memory assigned to the each non-processed pixel; and determining the dot on-off state in each non-processed pixel, based on the tone value of the each non-processed pixel, by taking into account the calculated diffusion errors.

22. A program for actualizing a method that receives image data representing a tone value of each pixel, determines dot on-off state in each pixel by taking into account the tone value of the pixel, and converts the image data into a specific expression format based on the dot on-off state, said program causing a computer to attain the functions of:

calculating a tone error arising in each pixel due to determination of the dot on-off state in the pixel, based on a result of the determination of the dot on-off state, and storing the calculated tone error in an error memory assigned to the each pixel;

registering a tone error in a temporary memory assigned to each processed pixel, which has already undergone the determination of the dot on-off state and is in a neighborhood of a current pixel of interest that is a current object of the determination of the dot on-off state;

determining the dot on-off state in the current pixel of interest, based on the tone value of the current pixel of interest, by taking into account the tone error registered in the temporary memory assigned to the each processed pixel;

detecting processed pixels in a neighborhood of a next pixel of interest, which is a next object of the determination of the dot on-off state after the current pixel of interest; and reading out a tone error of a specific processed pixel, which is among the detected processed pixels and does not have the registered tone error in the temporary memory, from the error memory assigned each pixel, and updating a tone error that is not used for the determination of the dot on-off state in the next pixel of interest to the read-out tone error, so as to cause the updated tone error to be used for the determination of the dot on-off state in the next pixel of interest.

* * * * *

UNITED STATES PATENT AND TRADEMARK OFFICE
CERTIFICATE OF CORRECTION

PATENT NO. : 6,870,641 B2  
DATED : March 22, 2005  
INVENTOR(S) : Toshiaki Kakutani It is certified that error appears in the above-identified patent and that said Letters Patent is hereby corrected as shown below:

Title page,  
Item [56], References Cited, FOREIGN PATENT DOCUMENTS, please add the following:
- EPO      1988 - 0 272 147      6/1988
- WIPO      1989 - 89/06080      6/1989
- EPO      1990 - 0 369 778      5/1990
- EPO      1994 - 0 576 786 A2      1/1994 --

Column 21,  
Line 1, change "RIO" to -- R10 --.  
Line 53, change "pixels sum" to -- pixels and sum --.

Column 42,  
Line 62, change "pixel aid" to -- pixel and --.

Column 43,  
Line 40, change "error tat" to -- error that --.  
Line 40, change "used for that" to -- used for the --  
Line 40, change "determination on of" to -- determination of --.  
Line 57, change "preset amber" to -- preset number --.

Column 45,  
Line 28, change "at the current" to -- after the current --.

Column 46,  
Line 37, change "method tat" to -- method that --.

Signed and Sealed this

Twenty-eighth Day of June, 2005

JON W. DUDAS  
*Director of the United States Patent and Trademark Office*